United States Patent
Shimamoto et al.

(10) Patent No.: US 9,595,737 B2
(45) Date of Patent: Mar. 14, 2017

(54) NON-AQUEOUS ELECTROLYTE AND POWER STORAGE DEVICE USING SAME

(71) Applicant: UBE INDUSTRIES, LTD., Ube-shi (JP)

(72) Inventors: Kei Shimamoto, Shimonoseki (JP); Yuichi Kotou, Ube (JP); Shoji Shikita, Ube (JP)

(73) Assignee: UBE INDUSTRIES, LTD., Ube-shi (JP)

(*) Notice: Subject to any disclaimer, the term of this patent is extended or adjusted under 35 U.S.C. 154(b) by 184 days.

(21) Appl. No.: 14/400,180

(22) PCT Filed: May 13, 2013

(86) PCT No.: PCT/JP2013/063340
§ 371 (c)(1),
(2) Date: Nov. 10, 2014

(87) PCT Pub. No.: WO2013/168821
PCT Pub. Date: Nov. 14, 2013

(65) Prior Publication Data
US 2015/0125761 A1    May 7, 2015

(30) Foreign Application Priority Data

| May 11, 2012 | (JP) | 2012-109996 |
| Jun. 15, 2012 | (JP) | 2012-136023 |
| Jun. 15, 2012 | (JP) | 2012-136084 |
| Jul. 17, 2012 | (JP) | 2012-158912 |
| Jul. 25, 2012 | (JP) | 2012-164677 |
| Jul. 25, 2012 | (JP) | 2012-164696 |
| Aug. 10, 2012 | (JP) | 2012-177658 |
| Jan. 10, 2013 | (JP) | 2013-002880 |

(51) Int. Cl.
| H01M 10/0569 | (2010.01) |
| H01M 10/0566 | (2010.01) |
| H01M 10/056 | (2010.01) |
| H01M 10/0567 | (2010.01) |
| H01M 10/0525 | (2010.01) |
| H01M 10/0568 | (2010.01) |
| H01G 11/60 | (2013.01) |
| H01G 11/62 | (2013.01) |

(52) U.S. Cl.
CPC ........ *H01M 10/0567* (2013.01); *H01G 11/60* (2013.01); *H01G 11/62* (2013.01); *H01M 10/0525* (2013.01); *H01M 10/0568* (2013.01); *H01M 10/0569* (2013.01); *H01M 2300/0025* (2013.01); *H01M 2300/0028* (2013.01); *Y02E 60/122* (2013.01); *Y02E 60/13* (2013.01)

(58) Field of Classification Search
None
See application file for complete search history.

(56) References Cited

U.S. PATENT DOCUMENTS

| 6,210,835 B1 | 4/2001 | Arai |
| 2001/0010877 A1 | 8/2001 | Arai |
| 2012/0295156 A1 | 11/2012 | Yano et al. |
| 2012/0301784 A1 | 11/2012 | Yano et al. |
| 2012/0301797 A1 | 11/2012 | Abe et al. |
| 2013/0129595 A1 | 5/2013 | Schulz et al. |

FOREIGN PATENT DOCUMENTS

| DE | EP 1095942 | * 5/2001 | ............... C07F 5/02 |
| JP | 11 307123 | 11/1999 | |
| JP | 2003 272703 | 9/2003 | |
| JP | 2007 317655 | 12/2007 | |
| JP | 2012 243485 | 12/2012 | |
| JP | 2012 243696 | 12/2012 | |
| WO | WO 2011/096450 A1 | 8/2011 | |
| WO | WO 2012/016924 A1 | 2/2012 | |

OTHER PUBLICATIONS

English translation of EP 1095942 (2001).*
Extended European Search Report issued Sep. 23, 2015 in Patent Application No. 13787043.2
International Search Report Issued Aug. 13, 2013 in PCT/JP13/063340 Filed May 13, 2013.

* cited by examiner

*Primary Examiner* — Yoshitoshi Takeuchi
(74) *Attorney, Agent, or Firm* — Oblon, McClelland, Maier & Neustadt, L.L.P.

(57) ABSTRACT

The present invention includes [1] a nonaqueous electrolytic solution of an electrolyte salt dissolved in a nonaqueous solvent, the nonaqueous electrolytic solution containing from 0.001 to 5% by mass of a specified acyclic lithium salt in the nonaqueous electrolytic solution and being capable of improving electrochemical characteristics in a broad temperature range; and [2] an energy storage device including a positive electrode, a negative electrode, and a nonaqueous electrolytic solution of an electrolyte salt dissolved in a nonaqueous solvent, the nonaqueous electrolytic solution containing from 0.001 to 5% by mass of a specified acyclic lithium salt in the nonaqueous electrolytic solution.

17 Claims, No Drawings

NON-AQUEOUS ELECTROLYTE AND POWER STORAGE DEVICE USING SAME

TECHNICAL FIELD

The present invention relates to a nonaqueous electrolytic solution capable of improving electrochemical characteristics in a broad temperature range of an energy storage device, and an energy storage device using the same.

BACKGROUND ART

An energy storage device, especially a lithium secondary battery, has been widely used recently for a small-sized electronic device, such as a mobile telephone and a notebook personal computer, an electric vehicle, and an electric power storage. The electronic devices and vehicles may be used in a broad temperature range, for example, at midsummer high temperatures and frigid low temperatures, and therefore the energy storage device is required to have well-balanced and improved electrochemical characteristics in a broad temperature range.

Especially for preventing global warming, it is imperative to reduce $CO_2$ emissions, and among eco-friendly vehicles having mounted thereon an energy storage equipment containing an energy storage device, such as a lithium secondary battery and a capacitor, early popularization of a hybrid electric vehicle (HEV), a plug-in hybrid electric vehicle (PHEV) and a battery electric vehicle (BEV) is being desired. Vehicles may travel long distance and therefore may be used in regions with a broad temperature range covering from extremely-hot tropical regions to frigid regions. In particular, therefore, the in-vehicle energy storage device is demanded to have electrochemical characteristics that are not deteriorated even used in a broad temperature range covering from high temperatures to low temperatures.

In this specification, the term, lithium secondary battery, referred herein is used as a concept including a so-called lithium ion secondary battery.

A lithium secondary battery is mainly constituted by a positive electrode and a negative electrode, which contains a material capable of absorbing and releasing lithium, and a nonaqueous electrolytic solution containing a lithium salt and a nonaqueous solvent. Examples of the nonaqueous solvent used include a carbonate, such as ethylene carbonate (EC) and propylene carbonate (PC).

Known examples of the negative electrode include metal lithium, and a metal compound (a metal elemental substance, an oxide and an alloy with lithium, etc.) and a carbon material capable of absorbing and releasing lithium. In particular, a lithium secondary battery using a carbon material capable of absorbing and releasing lithium, such as coke, artificial graphite and natural graphite, has been widely put into practical use.

For example, it is known that, in a lithium secondary battery using a highly-crystalline carbon material, such as natural graphite and artificial graphite as the negative electrode material therein, a decomposed product and gas generated through reductive decomposition of the solvent in the nonaqueous electrolytic solution on the surface of the negative electrode during charging inhibit the electrochemical reaction favorable for the battery, which may worsen the cycle property of the battery. Deposition of the decomposed product of the nonaqueous solvent inhibits smooth absorption and release of lithium by the negative electrode, which may worsen the electrochemical characteristics of the battery on using in a broad temperature range.

Furthermore, it is known that a lithium secondary battery using a lithium metal or an alloy thereof, or a metal elemental substance, such as tin and silicon, or a metal oxide thereof as the negative electrode material may have a high initial battery capacity, but the battery capacity and the battery performance thereof, such as the cycle property, may be largely worsened since the micronized powdering of the material may be promoted during cycles, which brings about accelerated reductive decomposition of the nonaqueous solvent, as compared with the negative electrode formed of a carbon material. In addition, the micronized powdering of the negative electrode material and the accumulation of the decomposed products of the nonaqueous solvent would interfere with smooth absorption and release of lithium by the negative electrode, thereby often worsening the electrochemical characteristics of the battery on using in a broad temperature range.

On the other hand, it is also known that, in a lithium secondary battery using, for example, $LiCoO_2$, $LiMn_2O_4$, $LiNiO_2$, $LiFePO_4$ or the like as the positive electrode, the nonaqueous solvent in the nonaqueous electrolytic solution locally undergoes partial oxidative decomposition at the interface between the positive electrode material and the nonaqueous electrolytic solution in a charged state, the decomposed product and the gas generated thereby may inhibit the electrochemical reaction favorable for the battery, and thereby the electrochemical characteristics of the battery may be worsened on using in a broad temperature range.

As described above, the decomposed product and the gas generated through decomposition of the nonaqueous electrolytic solution on the positive electrode or the negative electrode may inhibit migration of lithium ions or may swell the battery, which may worsen the battery performance. Irrespective of the situation, the multifunctionality of electronic appliances equipped with lithium secondary batteries therein is more and more enhanced and power consumption tends to increase. The capacity of lithium secondary battery is thus being much increased, and the space volume for the nonaqueous electrolytic solution in the battery is decreased by increasing the density of the electrode, by reducing the useless space volume in the battery, or the like. Accordingly, the current situation is that the electrochemical characteristics of the battery on using in a broad temperature range may be worsened even with decomposition of only a small amount of the nonaqueous electrolytic solution.

In order to increase safety, PTL 1 proposes a nonaqueous electrolyte secondary battery containing a molten salt, such as lithium acetate trifluoroborate, lithium methanesulfonate trifluoroborate, etc.; and it is suggested that these compounds are liquid at ordinary temperature (in the neighborhood of 25° C.) and do not substantially use an organic solvent, so that they are not substantially volatilized, and thus, the safety becomes high.

PTL 2 discloses a nonaqueous electrolytic solution which is a nonaqueous electrolytic solution to be used for a secondary battery provided with a negative electrode active material having Si, Sn, or Pb and is capable of improving battery characteristics by containing two kinds of first and second lithium salts.

CITATION LIST

Patent Literature

PTL 1: JP-A 2003-272703
PTL 2: JP-A 2007-317655

SUMMARY OF INVENTION

Technical Problem

An object of the present invention is to provide a nonaqueous electrolytic solution that is capable of improving electrochemical characteristics in a broad temperature range, and an energy storage device using the same.

Solution to Problem

The present inventors made extensive and intensive investigations regarding performances of the above-described background-art nonaqueous electrolytic solutions, and as a result, it has been noted that in the nonaqueous electrolyte secondary battery of the above-described PTL 1, since the solvent is not substantially used, the viscosity is so high that the liquid resistance is increased, and thus, it does not substantially exhibit an effect against a problem of improving electrochemical characteristics in a broad temperature range, such as low-temperature discharging properties after high-temperature storage or high-temperature cycle, etc. In addition, in an electrolytic solution of a mixture of a cyclic carbonate compound, such as ethylene carbonate, propylene carbonate, etc., with the same mass of lithium methanesulfonate trifluoroborate or lithium acetate trifluoroborate, the liquid resistance is similarly increased, and thus, it was the actual state that it does not substantially exhibit an effect against a problem of improving electrochemical characteristics in a broad temperature range, such as low-temperature discharging properties after high-temperature storage or high-temperature cycle, etc.

In addition, although the nonaqueous electrolytic solution of PTL 2 is a nonaqueous electrolytic solution for secondary batteries provided with a negative electrode active material having Si, Sn, or Pb, a specified acyclic lithium salt which is added to the nonaqueous electrolytic solution of the present invention is not disclosed.

Then, in order to solve the above-described problems, the present inventors made extensive and intensive investigations, and as a result, it has been found that in a nonaqueous electrolytic solution of an electrolyte salt dissolved in a nonaqueous solvent, by containing one or more kinds of specified acyclic lithium salts in a specified addition amount, electrochemical characteristics of an energy storage device in a broad temperature range, especially electrochemical characteristics of a lithium battery can be improved, leading to accomplishment of the present invention. Such an effect is not suggested by the above-described PTL 1 at all.

Under such circumstances, the present invention provides the following [1] and [2].

[1] A nonaqueous electrolytic solution of an electrolyte salt dissolved in a nonaqueous solvent, which comprises one or more selected from acyclic lithium salts represented by the following general formula (I) or (II) in an amount of from 0.001 to 5% by mass in the nonaqueous electrolytic solution.

(wherein $A^1$ is a group represented by the following general formula (III) or (IV); Y is a boron atom, a phosphorus atom, or an arsenic atom; and F is a fluorine atom. m is an integer of 3 or 5; p is from 1 to 6; and q represents a valence of the group $A^1$ and is 1 or 2. However, when the group $A^1$ is monovalent (q=1), then p is from 1 to 3, and when the group $A^1$ is divalent (q=2), then p is from 2 to 6.

When Y is a boron atom, then m is 3, and when Y is a phosphorus atom or an arsenic atom, then m is 5.)

(In the formula, $A^2$ is a group represented by the following general formula (III); and plural $A^2$s may be the same as or different from each other. Y is a boron atom, a phosphorus atom, or an arsenic atom; and F is a fluorine atom. When Y is a boron atom, then x is an integer of from 2 to 4, and (x+n) is 4; and when Y is a phosphorus atom or an arsenic atom, then x is an integer of from 2 to 6, and (x+n) is 6.)

[Chem. 1]

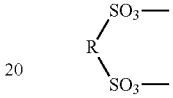

(In the formulae, R represents an alkyl group having from 1 to 6 carbon atoms, an alkenyl group having from 2 to 6 carbon atoms, an aryl group having from 6 to 12 carbon atoms, an alkylene group having from 1 to 6 carbon atoms, or a halogen atom. At least one of hydrogen atoms which R has may be substituted with a halogen atom.)

[2] An energy storage device comprising a positive electrode, a negative electrode, and a nonaqueous electrolytic solution of an electrolyte salt dissolved in a nonaqueous solvent, the nonaqueous electrolytic solution containing one or more selected from acyclic lithium salts represented by the foregoing general formula (I) or (II), or acyclic lithium salts represented by any of the general formulae (XI) to (XIII) as described later in an amount of from 0.001 to 5% by mass in the nonaqueous electrolytic solution.

Advantageous Effects of Invention

According to the present invention, it is possible to provide a nonaqueous electrolytic solution capable of improving electrochemical characteristics of an energy storage device in the case of being used in a broad temperature range, especially low-temperature discharging characteristics after high-temperature storage or high-temperature cycle, and an energy storage device using the same, such as lithium batteries, etc.

DESCRIPTION OF EMBODIMENTS

The present invention relates to a nonaqueous electrolytic solution capable of improving electrochemical characteristics in a broad temperature range of an energy storage device, and an energy storage device using the same.
[Nonaqueous Electrolytic Solution]

The nonaqueous electrolytic solution of the present invention is a nonaqueous electrolytic solution of an electrolyte salt dissolved in a nonaqueous solvent, which comprises one or more selected from acyclic lithium salts represented by the following general formula (I) or (II) in an amount of from 0.001 to 5% by mass in the nonaqueous electrolytic solution.

(In the formula, $A^1$ is a group represented by the following general formula (III) or (IV); Y is a boron atom, a phosphorus atom, or an arsenic atom; and F is a fluorine atom. m is an integer of 3 or 5; p is from 1 to 6; and q represents a valence of the group $A^1$ and is 1 or 2. However, when the group $A^1$ is monovalent (q=1), then p is from 1 to 3, and when the group $A^1$ is divalent (q=2), then p is from 2 to 6. When Y is a boron atom, then m is 3, and when Y is a phosphorus atom or an arsenic atom, then m is 5.)

$$(A^2)x(YFn)(Li) \quad (II)$$

(In the formula, $A^2$ is a group represented by the following general formula (III); and plural $A^2$s may be the same as or different from each other. Y is a boron atom, a phosphorus atom, or an arsenic atom; and F is a fluorine atom. When Y is a boron atom, then x is an integer of from 2 to 4, and (x+n) is 4; and when Y is a phosphorus atom or an arsenic atom, then x is an integer of from 2 to 6, and (x+n) is 6.)

[Chem. 2]

$$R\text{—}SO_3\text{—} \quad (III)$$

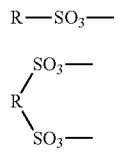

(IV)

(In the formulae, R represents an alkyl group having from 1 to 6 carbon atoms, an alkenyl group having from 2 to 6 carbon atoms, an aryl group having from 6 to 12 carbon atoms, an alkylene group having from 1 to 6 carbon atoms, or a halogen atom. At least one of hydrogen atoms which R has may be substituted with a halogen atom.)

As the acyclic lithium salt represented by the foregoing general formula (I) or (II), one or more selected from acyclic lithium salts represented by any of the following general formulae (XI) to (XIII) are preferable.

[Chem. 3]

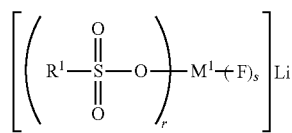 (XI)

(In the formula, $R^1$ represents an alkyl group having from 1 to 6 carbon atoms, an alkenyl group having from 2 to 6 carbon atoms, an aryl group having from 6 to 12 carbon atoms, or a halogen atom; $M^1$ represents a boron atom, a phosphorus atom, or an arsenic atom; r is an integer of from 1 to 6; and s is an integer of from 0 to 5. When $M^1$ is a boron atom, then (r+s) is 4; and when $M^1$ is a phosphorus atom or an arsenic atom, then (r+s) is 6. At least one of hydrogen atoms which $R^1$ has may be substituted with a halogen atom.)

[Chem. 4]

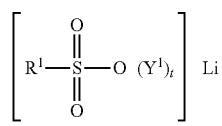 (XII)

(In the formula, $R^1$ is the same as described above; $Y^1$ represents $BF_3$, $PF_5$, or $AsF_5$; and t is from 1 to 3. When $Y^1$ is $BF_3$, then t is from 1 to 3; and when $Y^1$ is $PF_5$ or $AsF_5$, then t is 1.)

[Chem. 5]

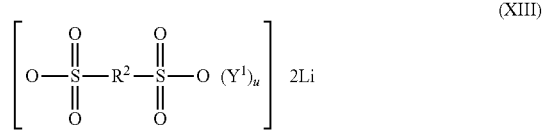 (XIII)

(In the formula, $R^2$ represents an alkylene group having from 1 to 6 carbon atoms; $Y^1$ is the same as described above; and u is from 2 to 6. When $Y^1$ is $BF_3$, then u is from 2 to 6; and when $Y^1$ is $PF_5$ or $AsF_5$, then u is 2. At least one of hydrogen atoms which $R^2$ has may be substituted with a halogen atom.)

Although the reason why the nonaqueous electrolytic solution of the present invention is capable of significantly improving electrochemical characteristics of an energy storage device in abroad temperature range has not always been elucidated yet, the following may be considered.

When the acyclic lithium salt represented by the foregoing general formula (I) or (II) or the acyclic lithium salt represented by any of the foregoing general formula (XI) to (XIII) is used in a high concentration in the nonaqueous electrolytic solution, the viscosity of the electrolytic solution greatly increases, and therefore, an electroconductivity is lowered, and charging and discharging characteristics at low temperatures are greatly lowered. Meanwhile, it has become clear that when one or more selected from acyclic lithium salts represented by the foregoing general formula (I) or (II) or acyclic lithium salts represented by any of the foregoing general formula (XI) to (XIII) are added in a small amount to a nonaqueous electrolytic solution of an electrolyte salt, such as $LiPF_6$, etc., in a nonaqueous solvent, the electroconductivity is not lowered, and the resulting nonaqueous electrolytic solution is decomposed in a negative electrode to form a surface film with low resistance, whereby an effect for improving the electrochemical characteristics in a broad temperature range is much more increased.

The acyclic lithium salts represented by any of the general formulae (XI) to (XIII) are successively described below.

(1) Lithium salt represented by the general formula (XI)

[Chem. 6]

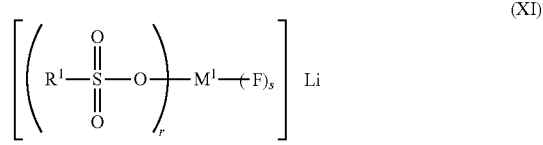 (XI)

(In the formula, $R^1$ represents an alkyl group having from 1 to 6 carbon atoms, an alkenyl group having from 2 to 6 carbon atoms, an aryl group having from 6 to 12 carbon atoms, or a halogen atom; $M^1$ represents a boron atom, a phosphorus atom, or an arsenic atom; r is an integer of from 1 to 6; and s is an integer of from 0 to 5. When $M^1$ is a boron atom, then (r+s) is 4; and when $M^1$ is a phosphorus atom or an arsenic atom, then (r+s) is 6. At least one of hydrogen atoms which $R^1$ has may be substituted with a halogen atom.)

As the lithium salt represented by the general formula (XI), lithium salts represented by the general formula (XI-1) or (XI-2) are preferably exemplified.

[Chem. 7]

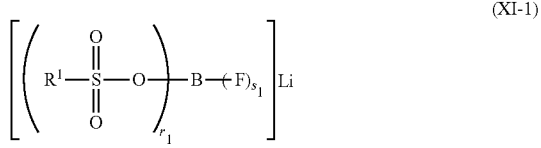

(XI-1)

In the general formula (XI-1), $R^1$ is the same as described above; $r_1$ represents an integer of from 1 to 4; $s_1$ represents an integer of from 0 to 3; $(r_1+s_1)=4$; and $r_1$ is preferably 1 or 2, and more preferably 1.

[Chem. 8]

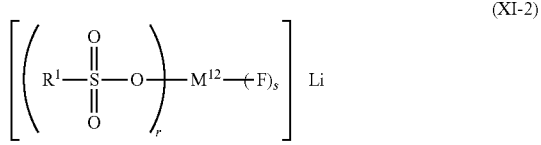

(XI-2)

In the general formula (XI-2), $R^1$ is the same as described above; $M^{12}$ represents a phosphorus atom or an arsenic atom; r represents an integer of from 1 to 6; s represents an integer of from 0 to 5; $(r+s)=6$; and r is preferably 1 or 2, and more preferably 1.

In the foregoing general formula (XI), (XI-1), or (XI-2), $R^1$ represents an alkyl group having from 1 to 6 carbon atoms, in which at least one hydrogen atom may be substituted with a halogen atom, an alkenyl group having from 2 to 6 carbon atoms, in which at least one hydrogen atom may be substituted with a halogen atom, an aryl group having from 6 to 12 carbon atoms, in which at least one hydrogen atom may be substituted with a halogen atom, or a halogen atom; and is preferably an alkyl group having from 1 to 4 carbon atoms or an alkenyl group having from 2 to 4 carbon atoms, in which at least one hydrogen atom may be substituted with a halogen atom, an aryl group having from 6 to 10 carbon atoms, in which at least one hydrogen atom may be substituted with a halogen atom, a fluorine atom, or a chlorine atom, and more preferably an alkyl group having one or two carbon atoms or an alkenyl group having from 2 to 3 carbon atoms, in which at least one hydrogen atom may be substituted with a halogen atom, or an aryl group having from 6 to 8 carbon atoms.

As specific examples of the above-described $R^1$, there are suitably exemplified linear alkyl groups, such as a methyl group, an ethyl group, an n-propyl group, an n-butyl group, an n-pentyl group, an n-hexyl group, etc.; branched alkyl groups, such as an isopropyl group, a sec-butyl group, a tert-butyl group, a tert-amyl group, etc.; fluoroalkyl groups, such as a fluoromethyl group, a difluoromethyl group, a trifluoromethyl group, a 2,2,2-trifluoroethyl group, etc.; alkenyl groups, such as a vinyl group, a 1-propenyl group, a 2-propenyl group, a 1-propen-2-yl group, a 2-butenyl group, a 3-butenyl group, a 4-pentenyl group, a 5-hexenyl group, a 2-methyl-2-propenyl group, etc.; aryl groups, such as a phenyl group, a 2-methylphenyl group, a 3-methylphenyl group, a 4-methylphenyl group, a 4-tert-butyl phenyl group, a 2-fluorophenyl group, a 4-fluorophenyl group, a 4-trifluoromethylphenyl group, etc.; and halogen atoms, such as a fluorine atom, a chlorine atom, etc. Of these, a methyl group, an ethyl group, an n-propyl group, an n-butyl group, an isopropyl group, a sec-butyl group, a trifluoromethyl group, a 2,2,2-trifluoroethyl group, a vinyl group, a 2-propenyl group, a 1-propen-2-yl group, a phenyl group, a 4-methylphenyl group, and a fluorine atom are preferable; and a methyl group, an ethyl group, an isopropyl group, a vinyl group, a 2-propenyl group, and a 4-methylphenyl group are more preferable.

Specific examples of the lithium salt represented by the foregoing general formula (XI-1) or (XI-2) include the following compounds.

(1) Lithium Salt Represented by the General Formula (XI-1)

Examples of the lithium salt represented by the general formula (XI-1) include lithium bis(methanesulfonate)difluoroborate, lithium tris(methanesulfonate) fluoroborate, lithium tetrakis(methanesulfonate)borate, lithium methanesulfonate trifluoroborate, lithium ethanesulfonate trifluoroborate, lithium propane-1-sulfonate trifluoroborate, lithium propane-2-sulfonate trifluoroborate, lithium butane-1-sulfonate trifluoroborate, lithium butane-2-sulfonate trifluoroborate, lithium 2-methylpropane-2-sulfonate trifluoroborate, lithium pentane-1-sulfonate trifluoroborate, lithium hexane-1-sulfonate trifluoroborate, lithium trifluoromethanesulfonate trifluoroborate, lithium 2,2,2-trifluoroethanesulfonate trifluoroborate, lithium vinyl sulfonate trifluoroborate, lithium 1-propen-1-ylsulfonate trifluoroborate, lithium 1-propen-2-ylsulfonate trifluoroborate, lithium 2-propen-1-ylsulfonate trifluoroborate, lithium 2-buten-1-ylsulfonate trifluoroborate, lithium 3-butene-1-ylsulfonate trifluoroborate, lithium 4-penten-1-ylsulfonate trifluoroborate, lithium 5-hexen-1-ylsulfonate trifluoroborate, lithium 2-methyl-2-propen-1-ylsulfonate trifluoroborate, lithium benzenesulfonate trifluoroborate, lithium 2-methylbenzenesulfonate trifluoroborate, lithium 3-methylbenzenesulfonate trifluoroborate, lithium 4-methylbenzenesulfonate trifluoroborate, lithium 4-tert-butylbenzenesulfonate trifluoroborate, lithium 2-fluorobenzenesulfonate trifluoroborate, lithium 4-fluorobenzenesulfonate trifluoroborate, lithium 4-trifluoromethylbenzenesulfonate trifluoroborate, lithium fluorosulfonate trifluoroborate, lithium chlorosulfonate trifluoroborate, and the like.

Among the lithium salts represented by the general formula (XI-1), one or more selected from lithium bis(methanesulfonate)difluoroborate, lithium tris(methanesulfonate) fluoroborate, lithium tetrakis(methanesulfonate)borate, lithium methanesulfonate trifluoroborate, lithium ethanesulfonate trifluoroborate, lithium propane-1-sulfonate trifluoroborate, lithium propane-2-sulfonate trifluoroborate, lithium 2-methylpropane-2-sulfonate trifluoroborate, lithium trifluoromethanesulfonate trifluoroborate, lithium 2,2,2-trifluoroethanesulfonate trifluoroborate, lithium vinylsulfonate trifluoroborate, lithium 1-propen-1-ylsulfonate trifluoroborate, lithium 1-propen-2-ylsulfonate trifluoroborate, lithium 2-propen-1-ylsulfonate trifluoroborate, lithium benzenesulfonate trifluoroborate, lithium 2-methylbenzenesulfonate trifluoroborate, lithium 3-methylbenzenesulfonate trifluoroborate, lithium 4-methylbenzenesulfonate trifluoroborate, lithium 2-fluorobenzenesulfonate trifluoroborate, lithium 4-fluorobenzenesulfonate trifluoroborate, and lithium fluorosulfonate trifluoroborate are preferable; one or more selected from lithium bis(methanesulfonate) difluoroborate, lithium tris(methanesulfonate) fluoroborate, lithium tetrakis(methanesulfonate)borate, lithium methanesulfonate trifluoroborate, lithium ethanesulfonate trifluoroborate, lithium propane-2-sulfonate trifluoroborate, lithium trifluoromethanesulfonate trifluoroborate, lithium vinylsulfonate trifluoroborate, lithium 2-propen-1-ylsulfonate trifluoroborate, lithium benzenesulfonate trifluoroborate, lithium 4-methylbenzenesulfonate trifluoroborate, and lithium fluorosulfonate trifluoroborate are more preferable.

The lithium salt represented by the foregoing general formula (XI-1) can be prepared by a method of allowing a lithium sulfonate compound and a trifluoroborane-ether complex to react with each other, or a method of blowing a BF3 gas into a lithium sulfonate compound in the presence or absence of a solvent. In addition, the lithium salt represented by the foregoing general formula (XI-1) can also be prepared by a method of allowing lithium tetrafluoroborate and a trimethylsilyl sulfonate compound to react with each other.

By containing the lithium salt represented by the foregoing general formula (XI-1) in the nonaqueous electrolytic solution, a peculiar effect that the electrochemical characteristics are synergistically improved in a wide temperature range is revealed.

(2) Lithium Salt Represented by the General Formula (XI-2)

Examples of the lithium salt represented by the general formula (XI-2) include lithium methanesulfonate pentafluorophosphate, lithium bis(methanesulfonate)tetrafluorophosphate, lithium tris(methanesulfonate)trifluorophosphate, lithium tetrakis(methanesulfonate)difluorophosphate, lithium pentakis(methanesulfinate) fluorophosphate, lithium hexakis(methanesulfonate) fluorophosphate, lithium ethanesulfonate pentafluorophosphate, lithium propane-1-sulfonate pentafluorophosphate, lithium propane-2-sulfonate pentafluorophosphate, lithium butane-1-sulfonate pentafluorophosphate, lithium butane-2-sulfonate pentafluorophosphate, lithium 2-methylpropane-2-sulfonate pentafluorophosphate, lithium pentane-1-sulfonate pentafluorophosphate, lithium hexane-1-sulfonate pentafluorophosphate, lithium trifluoromethanesulfonate pentafluorophosphate, lithium 2,2,2-trifluoroethanesulfonate pentafluorophosphate, lithium vinylsulfonate pentafluorophosphate, lithium 1-propen-1-ylsulfonate pentafluorophosphate, lithium 1-propen-2-ylsulfonate pentafluorophosphate, lithium 2-propen-1-ylsulfonate pentafluorophosphate, lithium 2-buten-1-ylsulfonate pentafluorophosphate, lithium 3-buten-1-ylsulfonate pentafluorophosphate, lithium 4-penten-1-ylsulfonate pentafluorophosphate, lithium 5-hexen-1-ylsulfonate pentafluorophosphate, lithium 2-methyl-2-propen-1-ylsulfonate pentafluorophosphate, lithium benzenesulfonate pentafluorophosphate, lithium 2-methylbenzenesulfonate pentafluorophosphate, lithium 3-methylbenzenesulfonate pentafluorophosphate, lithium 4-methylbenzenesulfonate pentafluorophosphate, lithium 4-tert-butylbenzenesulfonate pentafluorophosphate, lithium 2-fluorobenzenesulfonate pentafluorophosphate, lithium 4-fluorobenzenesulfonate pentafluorophosphate, lithium 4-trifluoromethylbenzenesulfonate pentafluorophosphate, lithium fluorosulfonate pentafluorophosphate, lithium chlorosulfonate pentafluorophosphate, and the like.

Among the lithium salts represented by the general formula (XI-2), one or more selected from lithium methanesulfonate pentafluorophosphate, lithium ethanesulfonate pentafluorophosphate, lithium propane-1-sulfonate pentafluorophosphate, lithium propane-2-sulfonate pentafluorophosphate, lithium 2-methylpropane-2-sulfonate pentafluorophosphate, lithium trifluoromethanesulfonate pentafluorophosphate, lithium 2,2,2-trifluoroethanesulfonate pentafluorophosphate, lithium vinylsulfonate pentafluorophosphate, lithium 1-propen-1-ylsulfonate pentafluorophosphate, lithium 1-propen-2-ylsulfonate pentafluorophosphate, lithium 2-propen-1-ylsulfonate pentafluorophosphate, lithium benzenesulfonate pentafluorophosphate, lithium 2-methylbenzenesulfonate pentafluorophosphate, lithium 3-methylbenzenesulfonate pentafluorophosphate, lithium 4-methylbenzenesulfonate pentafluorophosphate, lithium 2-fluorobenzenesulfonate pentafluorophosphate, lithium 4-fluorobenzenesulfonate pentafluorophosphate, lithium fluorosulfonate pentafluorophosphate, lithium methanesulfonate pentafluoroarsenate, lithium ethanesulfonate pentafluoroarsenate, lithium trifluoromethanesulfonate pentafluoroarsenate, lithium 2,2,2-trifluoroethanesulfonate pentafluoroarsenate, lithium vinylsulfonate pentafluoroarsenate, lithium 1-propen-1-ylsulfonate pentafluoroarsenate, lithium 1-propen-2-ylsulfonate pentafluoroarsenate, lithium 2-propen-1-ylsulfonate pentafluoroarsenate, lithium benzenesulfonate pentafluoroarsenate, lithium 2-methylbenzenesulfonate pentafluoroarsenate, lithium 3-methylbenzenesulfonate pentafluoroarsenate, lithium 4-methylbenzenesulfonate pentafluoroarsenate, lithium 2-fluorobenzenesulfonate pentafluoroarsenate, lithium 4-fluorobenzenesulfonate pentafluoroarsenate, and lithium fluorosulfonate pentafluoroarsenate are preferable; and one or more selected from lithium methanesulfonate pentafluorophosphate, lithium ethanesulfonate pentafluorophosphate, lithium vinylsulfonate pentafluorophosphate, lithium 4-methylbenzenesulfonate pentafluorophosphate, lithium methanesulfonate pentafluoroarsenate, lithium ethanesulfonate pentafluoroarsenate, lithium vinylsulfonate pentafluoroarsenate, and lithium 4-methylbenzenesulfonate pentafluoroarsenate are more preferable.

The lithium salt represented by the foregoing general formula (XI-2) can be prepared by a method of introducing $PF_5$ or $AsF_5$ into a sulfonic acid lithium salt. In addition, the lithium salt represented by the foregoing general formula (XI-2) can also be prepared by a method of allowing lithium hexafluorophosphate or lithium hexafluoroarsenate and a trimethylsilyl sulfonate compound to react with each other.

By containing the lithium salt represented by the foregoing general formula (XI-2) in the nonaqueous electrolytic solution, a peculiar effect that the electrochemical characteristics are synergistically improved in a wide temperature range is revealed.

(2) Lithium salt represented by the general formula (XII)

[Chem. 9]

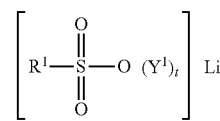

(XII)

(In the formula, $R^1$ is the same as described above; $Y^1$ represents $BF_3$, $PF_5$, or $AsF_5$; and t is from 1 to 3. When $Y^1$ is $BF_3$, then t is from 1 to 3; and when $Y^1$ is $PF_5$ or $AsF_5$, then t is 1.)

As the lithium salt represented by the general formula (XII), lithium salts represented by the general formula (XII-1) are preferably exemplified.

[Chem. 10]

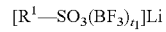

$[R^1{-}SO_3(BF_3)_{t_1}]Li$ (XII-1)

In the general formula (XII-1), $R^1$ is the same as described above, and $t_1$ is from 1 to 3; and a lower limit of $t_1$ is preferably 1.01 or more, more preferably 1.05 or more, and still more preferably 1.1 or more, whereas an upper limit thereof is preferably 2 or less, and more preferably 1.7 or less.

Specific examples and suitable examples of $R^1$ of the general formula (XII-1) are the same as the specific examples and suitable examples of $R^1$ of the general formula (XI-1).

In the lithium salt represented by the general formula (XII-1), a binding mode between the sulfonate anion and the boron trifluoride molecule is not particularly limited, and various binding modes, such as a direct bond, a coordinate bond, etc., can be taken.

Specific examples of the lithium salt represented by the foregoing general formula (XII-1) include the following Compounds 1 to 30.

[Chem. 11]

[H$_3$C—SO$_3$  (BF$_3$) t$_1$] Li  Compound 1

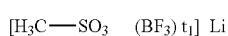 Compound 2

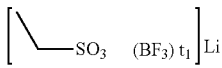 Compound 3

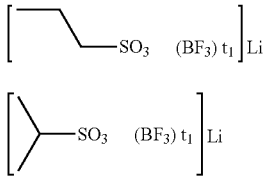 Compound 4

Compound 5

Compound 6

Compound 7

Compound 8

Compound 9

Compound 10

[CF$_3$—SO$_3$  (BF$_3$) t$_1$] Li  Compound 11

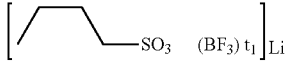 Compound 12

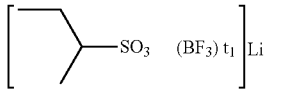 Compound 13

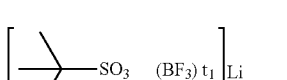 Compound 14

 Compound 15

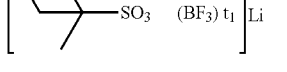 Compound 16

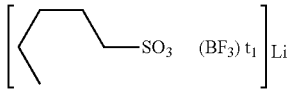 Compound 17

 Compound 18

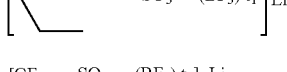 Compound 19

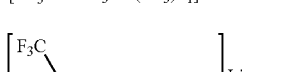 Compound 20

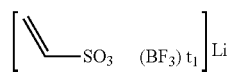 Compound 13

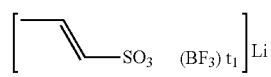 Compound 14

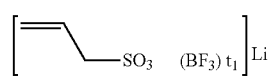 Compound 15

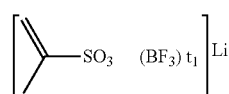 Compound 16

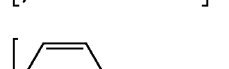 Compound 17

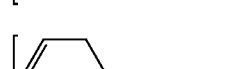 Compound 18

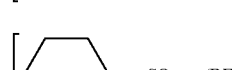 Compound 19

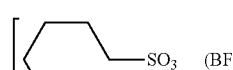 Compound 20

[F—SO$_3$  (BF$_3$) t$_1$] Li  Compound 21

[Cl—SO$_3$  (BF$_3$) t$_1$] Li  Compound 22

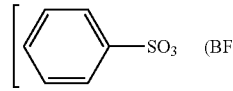 Compound 23

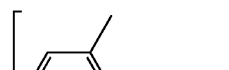 Compound 24

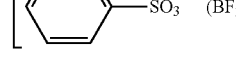 Compound 25

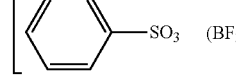 Compound 26

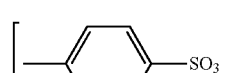 Compound 27

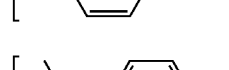 Compound 28

-continued

Compound 29
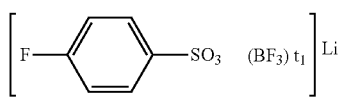

Compound 30
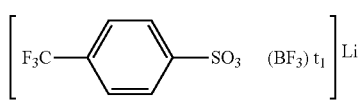

Of these compounds, one or more selected from the foregoing Compounds 1 to 7, 11 to 16, 21, 23 to 26, 28, and 29 are preferable; and one or more selected from the following Compound 1, Compound 2, Compound 4, Compound 11, Compound 13, Compound 15, Compound 21, Compound 23, and Compound 26 are more preferable.

[Chem. 12]

Compound 1

[H$_3$C—SO$_3$(BF$_3$)t$_1$] Li

Compound 2

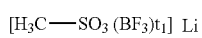

Compound 4

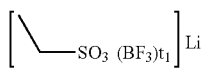

Compound 11

[CF$_3$—SO$_3$(BF$_3$)t$_1$] Li

Compound 13

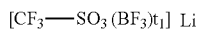

Compound 15

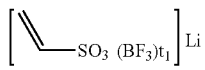

Compound 21

[F—SO$_3$(BF$_3$)t$_1$] Li

Compound 23

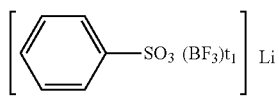

Compound 26

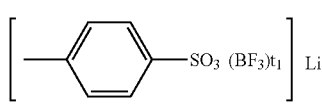

The lithium salt represented by the foregoing general formula (XII-1) can be prepared by a method of allowing a sulfonic acid lithium salt and a boron trifluoride-diethyl ether complex to react with each other, or a method of introducing boron trifluoride into a sulfonic acid lithium salt. In addition, the lithium salt represented by the foregoing general formula (XII-1) can also be prepared by a method of allowing lithium tetrafluoroborate and a trimethylsilyl sulfonate compound to react with each other.

By containing the lithium salt represented by the foregoing general formula (XII-1) in the nonaqueous electrolytic solution, a peculiar effect that the electrochemical characteristics are synergistically improved in a wide temperature range is revealed.

(3) Lithium Salt Represented by the General Formula (XIII)

[Chem. 13]

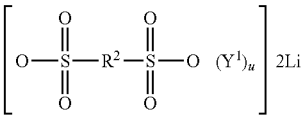

(XIII)

(In the formula, R$^2$ represents an alkylene group having from 1 to 6 carbon atoms; Y$^1$ is the same as described above; and u is from 2 to 6. When Y$^1$ is BF$_3$, then u is from 2 to 6; and when Y$^1$ is PF$_5$ or AsF$_5$, then u is 2. At least one of hydrogen atoms which R$^2$ has may be substituted with a halogen atom.)

As the lithium salt represented by the general formula (XIII), lithium salts represented by any of the general formulae (XIII-1), (XIII-2), and (XIII-3) are preferably exemplified.

[Chem. 14]

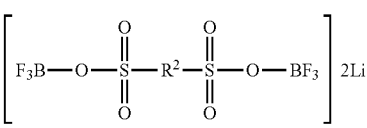

(XIII-1)

In the general formula (XIII-1), R$^2$ is the same as described above.

[Chem. 15]

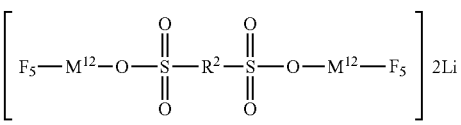

(XIII-2)

In the general formula (XIII-2), M$^{12}$ represents a phosphorus atom or an arsenic atom; and R$^2$ is the same as described above.

[Chem. 16]

[O$_3$S—R$^2$—SO$_3$BF$_3$)$_{u_1}$]2Li   (XIII-3)

In the general formula (XIII-3), R$^2$ is the same as described above; and u$_1$ is from 2 to 6. A lower limit of u$_1$ is preferably 2.02 or more, more preferably 2.1 or more, and still more preferably 2.2 or more; and an upper limit thereof is preferably 4 or less, and more preferably 3.4 or less.

In the lithium salt represented by the general formula (XIII-3), a binding mode between the sulfonate anion and the boron trifluoride molecule is not particularly limited, and various binding modes, such as a direct bond, a coordinate bond, etc., can be taken.

R$^2$ of the foregoing general formula (XIII), (XIII-1), (XIII-2), or (XIII-3) represents an alkylene group having from 1 to 6 carbon atoms, in which at least one hydrogen atom may be substituted with a halogen atom, and is preferably an alkylene group having one or two carbon atoms, in which at least one hydrogen atom may be substituted with a halogen atom.

As specific examples of the above-described $R^2$, there are suitably exemplified a methylene group, a fluoromethylene group, a difluoromethylene group, an ethane-1,2-diyl group, a propane-1,3-diyl group, a butane-1,4-diyl group, a pentane-1,5-diyl group, and a hexane-1,6-diyl group; a methylene group, a difluoromethylene group, an ethane-1,2-diyl group, and a propane-1,3-diyl group are more preferable; and a methylene group and an ethane-1,2-diyl group are especially preferable.

As described above, the alkylene group as referred to in the present specification is used as a concept also including a methylene group.

Specific examples of the lithium salt represented by the foregoing general formula (XIII-1), (XIII-2), or (XIII-3) include the following compounds.

(1) Lithium Salt Represented by the General Formula (XIII-1)

Examples of the lithium salt represented by the general formula (XIII-1) include dilithium methanedisulfonate bis(trifluoroborate), dilithium fluoromethanedisulfonate bis(trifluoroborae), dilithium difluoromethanedisulfonate bis(trifluoroborate), dilithium ethane-1,2-diyldisulfonate bis(trifluoroborate), dilithium propane-1,3-diyldisulfonate bis(trifluoroborate), dilithium butane-1,4-diyldisulfonate bis(trifluoroborate), dilithium pentane-1,5-diyldisulfonate bis(trifluoroborate), and dilithium hexane-1,6-diyldisulfonate bis(trifluoroborate).

Among the lithium salts represented by the general formula (XIII-1), one or more selected from dilithium methanedisulfonate bis(trifluoroborate), dilithium difluoromethanedisulfonate bis(trifluoroborate), dilithium ethane-1,2-diyldisulfonate bis(trifluoroborate), and dilithium propane-1,3-diyldisulfonate bis(trifluoroborate) are preferable; and one or more selected from dilithium methanedisulfonate bis(trifluoroborate) and dilithium ethane-1,2-diyldisulfonate bis(trifluoroborate) are more preferable.

The lithium salt represented by the foregoing general formula (XIII-1) can be prepared by a method of allowing a lithium sulfonate compound and a trifluoroborane-ether complex to react with each other, or a method of blowing a BF3 gas into a lithium sulfonate compound in the presence or absence of a solvent. In addition, the lithium salt represented by the foregoing general formula (XIII-1) can also be prepared by a method of allowing lithium tetrafluoroborate and a trimethylsilyl sulfonate compound to react with each other.

By containing the lithium salt represented by the foregoing general formula (XIII-1) in the nonaqueous electrolytic solution, a peculiar effect that the electrochemical characteristics are synergistically improved in a wide temperature range is revealed.

(2) Lithium Salt Represented by the General Formula (XIII-2)

Examples of the lithium salt represented by the general formula (XIII-2) include dilithium methanedisulfonate bis(pentafluorophosphate), dilithium fluoromethanedisulfonate bis(pentafluorophosphate), dilithium difluoromethanedisulfonate bis(pentafluorophosphate), dilithium ethane-1,2-diyldisulfonate bis(pentafluorophosphate), dilithium propane-1,3-diyldisulfonate bis(pentafluorophosphate), dilithium butane-1,4-diyldisulfonate bis(pentafluorophosphate), dilithium pentane-1,5-diyldisulfonate bis(pentafluorophosphate), dilithium hexane-1,6-diyldisulfonate bis(pentafluorophosphate), dilithium methanedisulfonate bis(pentafluoroarsenate), dilithium fluoromethanedisulfonate bis(pentafluoroarsenate), dilithium difluoromethanedisulfonate bis(pentafluoroarsenate), dilithium ethane-1,2-diyldisulfonate bis(pentafluoroarsenate), dilithium propane-1,3-diyldisulfonate bis(pentafluoroarsenate), dilithium butane-1,4-diyldisulfonate bis(pentafluoroarsenate), dilithium pentane-1,5-diyldisulfonate bis(pentafluoroarsenate), and dilithium hexane-1,6-diyldisulfonate bis(pentafluoroasrsenate).

Among the lithium salt represented by the general formula (XIII-2), one or more selected from dilithium methanedisulfonate bis(pentafluorophosphate), dilithium difluoromethanedisulfonate bis(pentafluorophosphate), dilithium ethane-1,2-diyldisulfonate bis(pentafluorophosphate), dilithium propane-1,3-diyldisulfonate bis(pentafluorophosphate), dilithium methanedisulfonate bis(pentafluoroarsenate), dilithium difluoromethanedisulfonate bis(pentafluoroarsenate), dilithium ethane-1,2-diyldisulfonate bis(pentafluoroarsenate), and dilithium propane-1,3-diyldisulfonate bis(pentafluoroarsenate) are preferable; and one or more selected from dilithium methanedisulfonate bis(pentafluorophosphate), dilithium ethane-1,2-diyldisulfonate bis(pentafluorophosphate), dilithium methanedisulfonate bis(pentafluoroarsenate), and dilithium ethane-1,2-diyldisulfonate bis(pentafluoroarsenate) are more preferable.

The lithium salt represented by the foregoing general formula (XIII-2) can be prepared by a method of introducing $PF_5$ or $AsF_5$ into a sulfonic acid lithium salt. In addition, the lithium salt represented by the foregoing general formula (XIII-2) can also be prepared by a method of allowing lithium hexafluorophosphate or lithium hexafluoroarsenate and a trimethylsilyl sulfonate compound to react with each other.

By containing the lithium salt represented by the foregoing general formula (XIII-2) in the nonaqueous electrolytic solution, a peculiar effect that the electrochemical characteristics are synergistically improved in a wide temperature range is revealed.

(3) Lithium Salt Represented by the General Formula (XIII-3)

Specific examples of the lithium salt represented by the foregoing general formula (XIII-3) include the following Compounds 31 to 38.

[Chem. 17]

Compound 31

Compound 32

Compound 33

Compound 34

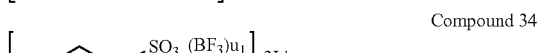

Compound 35

-continued

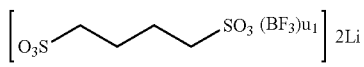
Compound 36

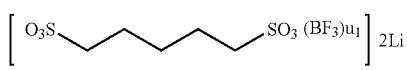
Compound 37

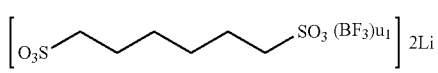
Compound 38

Of the lithium salts represented by the general formula (XIII-3), one or more selected from the foregoing Compounds 31, 34, and 35 are preferable; and one or two selected from Compounds 31 and Compound 34 are more preferable.

The lithium salt represented by the foregoing general formula (XIII-3) can be prepared by a method of allowing a sulfonic acid lithium salt and a boron trifluoride-diethyl ether complex to react with each other, or a method of introducing boron trifluoride into a sulfonic acid lithium salt. In addition, the lithium salt represented by the foregoing general formula (XIII-3) can also be prepared by a method of allowing lithium tetrafluoroborate and a trimethylsilyl sulfonate compound to react with each other.

By containing the lithium salt represented by the foregoing general formula (XIII-3) in the nonaqueous electrolytic solution, a peculiar effect that the electrochemical characteristics are synergistically improved in a wide temperature range is revealed.

In the nonaqueous electrolytic solution of the present invention, a content of one or more selected from the acyclic lithium salts represented by the foregoing general formula (I) or (II) to be contained in the nonaqueous electrolytic solution, more specifically the acyclic lithium salts represented by any of the foregoing general formulae (XI) to (XIII), or the acyclic lithium salts represented by any of the foregoing general formulae (XI-1), (XI-2), (XII-1), (XIII-1), (XIII-2), and (XIII-3) is preferably from 0.001 to 5% by mass in the nonaqueous electrolytic solution. When the content is 5% by mass or less, there is less concern that a surface film is excessively formed on an electrode, thereby causing a lowering of low-temperature characteristics, and when it is 0.001% by mass or more, a surface film is sufficiently formed, thereby increasing an effect for improving high-temperature storage property, and therefore, it is preferable that the content falls within the above-described range. The content is more preferably 0.05% by mass or more, and still more preferably 0.1% by mass or more in the nonaqueous electrolytic solution. In addition, an upper limit thereof is preferably 3% by mass or less, and more preferably 1% by mass or less.

In the nonaqueous electrolytic solution of the present invention, by combining one or more selected from the acyclic lithium salts represented by any of the foregoing general formulae with a nonaqueous solvent, an electrolyte salt, and furthermore, other additives as described below, a peculiar effect that the electrochemical characteristics are synergistically improved in a wide temperature range is revealed.

[Nonaqueous Solvent]

As the nonaqueous solvent which is used for the nonaqueous electrolytic solution of the present invention, there are exemplified one or more selected from cyclic carbonates, linear esters, ethers, amides, sulfones, and lactones. Because the electrochemical characteristics are synergistically improved in a wide temperature range, it is preferable that a cyclic carbonate is contained, and furthermore, it is preferable that a linear ester is contained. As the linear ester, it is preferable that a linear carbonate is contained, and it is more preferable that both a cyclic carbonate and a linear carbonate are contained.

It is to be noted that the term "linear ester" is used as a concept including a linear carbonate and a linear carboxylic acid ester.

As the cyclic carbonate, one or more selected from ethylene carbonate (EC), propylene carbonate (PC), 1,2-butylene carbonate, 2,3-butylene carbonate, 4-fluoro-1,3-dioxolan-2-one (FED), trans- or cis-4,5-difluoro-1,3-dioxolan-2-one (the both will be hereunder named generically as "DFEC"), vinylene carbonate (VC), vinyl ethylene carbonate (VEC), and 4-ethynyl-1,3-dioxolan-2-one (EEC) are exemplified; and one or more selected from ethylene carbonate, propylene carbonate, 4-fluoro-1,3-dioxolan-2-one, vinylene carbonate, and 4-ethynyl-1,3-dioxolan-2-one (EEC) are more suitable.

In addition, use of at least one member of the above-described cyclic carbonates having an unsaturated bond, such as a carbon-carbon double bond, a carbon-carbon triple bond, etc., or a fluorine atom is preferable because a low-temperature load characteristic after high-temperature charging storage is much more improved; and it is more preferable that both a cyclic carbonate containing an unsaturated bond, such as a carbon-carbon double bond, a carbon-carbon triple bond, etc., and a cyclic carbonate having a fluorine atom are contained. As the cyclic carbonate having an unsaturated bond, such as a carbon-carbon double bond, a carbon-carbon triple bond, etc., VC, VEC, and EEC are more preferable, and as the cyclic carbonate having a fluorine atom, FEC and DFEC are more preferable.

A content of the cyclic carbonate having an unsaturated bond, such as a carbon-carbon double bond, a carbon-carbon triple bond, etc., is preferably 0.07% by volume or more, more preferably 0.2% by volume or more, and still more preferably 0.7% by volume or more relative to a total volume of the nonaqueous solvent; and when an upper limit thereof is 7% by volume or less, more preferably 4% by volume or less, and still more preferably 2.5% by volume or less, stability of a surface film at the time of high-temperature storage can be much more increased without impairing Li ion permeability at low temperatures, and hence, such is preferable.

A content of the cyclic carbonate having a fluorine atom is preferably 0.07% by volume or more, more preferably 4% by volume or more, and still more preferably 7% by volume or more relative to a total volume of the nonaqueous solvent; and when an upper limit thereof is preferably 35% by volume or less, more preferably 25% by volume or less, and still more preferably 15% by volume or less, stability of a surface film at the time of high-temperature storage can be much more increased without impairing Li ion permeability at low temperatures, and hence, such is preferable.

In the case where the nonaqueous solvent contains both a cyclic carbonate having an unsaturated bond, such as a carbon-carbon double bond, a carbon-carbon triple bond, etc., and a cyclic carbonate having a fluorine atom, a content of the cyclic carbonate having an unsaturated bond, such as a carbon-carbon double bond, a carbon-carbon triple bond, etc., is preferably 0.2% by volume or more, more preferably 3% by volume or more, and still more preferably 7% by volume or more relative to a content of the cyclic carbonate having a fluorine atom; and when an upper limit thereof is preferably 40% by volume or less, more preferably 30% by volume or less, and still more preferably 15% by volume or less, stability of a surface film at the time of high-temperature storage can be much more increased without impairing Li ion permeability at low temperatures, and hence, such is especially preferable.

In addition, when the nonaqueous solvent contains ethylene carbonate, propylene carbonate, or both ethylene carbonate and propylene carbonate, resistance of a surface film formed on an electrode becomes small, and hence, such is preferable. A content of ethylene carbonate, propylene carbonate, or both ethylene carbonate and propylene carbonate is preferably 3% by volume or more, more preferably 5% by volume or more, and still more preferably 7% by volume or more relative to a total volume of the nonaqueous solvent; and an upper limit thereof is preferably 45% by volume or less, more preferably 35% by volume or less, and still more preferably 25% by volume or less.

These solvents may be used solely; and in the case where a combination of two or more of the solvents is used, the electrochemical characteristics are more improved in a broad temperature range, and hence, such is preferable, and use of a combination of three or more members thereof is especially preferable.

As suitable combinations of these cyclic carbonates, EC and PC; EC and VC; PC and VC; VC and FEC; EC and FEC; PC and FEC; FEC and DFEC; EC and DFEC; PC and DFEC; VC and DFEC; VEC and DFEC; VC and EEC; EC and EEC; EC, PC and VC; EC, PC and FEC; EC, VC and FEC; EC, VC and VEC; EC, VC and EEC; EC, EEC and FEC; PC, VC and FEC; EC, VC and DFEC; PC, VC and DFEC; EC, PC, VC and FEC; EC, PC, VC and DFEC; and the like are preferable. Among the above-described combinations, combinations, such as EC and VC; EC and FEC; PC and FEC; EC, PC and VC; EC, PC and FEC; EC, VC and FEC; EC, VC and EEC; EC, EEC and FEC; PC, VC and FEC; EC, PC, VC and FEC; etc., are more preferable.

As the linear ester, there are suitably exemplified one or more asymmetric linear carbonates selected from methyl ethyl carbonate (MEC), methyl propyl carbonate (MPC), methyl isopropyl carbonate (MIPC), methyl butyl carbonate, and ethyl propyl carbonate; one or more symmetric linear carbonates selected from dimethyl carbonate (DMC), diethyl carbonate (DEC), dipropyl carbonate, and dibutyl carbonate; and one or more linear carboxylic acid esters selected from pivalic acid esters, such as methyl pivalate, ethyl pivalate, propyl pivalate, etc., methyl propionate, ethyl propionate, methyl acetate, and ethyl acetate.

In the case of using a negative electrode in which a charging potential in a fully-charged state is less than 1 V on the Li basis, among the above-described linear esters, linear esters having a methyl group, which are selected from dimethyl carbonate, methyl ethyl carbonate, methyl propyl carbonate, methyl isopropyl carbonate, methyl butyl carbonate, methyl propionate, methyl acetate, and ethyl acetate are preferable, and linear carbonates having a methyl group are especially preferable. This is because by containing one or more selected from the lithium salts represented by any of the foregoing general formulae in the nonaqueous electrolytic solution using the above-described linear carbonate having a methyl group, decomposition of the nonaqueous electrolytic solution in the negative electrode hardly proceeds, so that deterioration of the capacity can be remarkably suppressed.

In addition, in the case of using a linear carbonate having a methyl group, it is preferable to use two or more kinds thereof. Furthermore, it is more preferable that both a symmetric linear carbonate and an asymmetric linear carbonate are contained, and it is still more preferable that a content of the symmetric linear carbonate is more than that of the asymmetric linear carbonate.

Although a content of the linear ester is not particularly limited, it is preferable to use the linear ester in an amount in the range of from 60 to 90% by volume relative to a total volume of the nonaqueous solvent. When the content is 60% by volume or more, the viscosity of the nonaqueous electrolytic solution does not become excessively high, whereas when it is 90% by volume or less, there is less concern that an electroconductivity of the nonaqueous electrolytic solution is lowered, thereby causing a lowering of the electrochemical characteristics in a broad temperature range, and therefore, it is preferable that the content of the linear ester falls within the above-described range.

A proportion of the volume of the symmetric linear carbonate occupying in the linear carbonate is preferably 51% by volume or more, and more preferably 55% by volume or more. An upper limit thereof is more preferably 95% by volume or less, and still more preferably 85% by volume or less. It is especially preferable that dimethyl carbonate is contained in the symmetric linear carbonate. In addition, it is more preferable that the asymmetric linear carbonate has a methyl group, and methyl ethyl carbonate is especially preferable.

The above-described case is preferable because the electrochemical characteristics are improved in a much broader temperature range.

As for a proportion of the cyclic carbonate and the linear ester, from the viewpoint of improving the electrochemical characteristics in a broad temperature range, a ratio of the cyclic carbonate to the linear ester (volume ratio) is preferably from 10/90 to 45/55, more preferably from 15/85 to 40/60, and still more preferably from 20/80 to 35/65.

As other nonaqueous solvents, there are suitably exemplified one or more selected from cyclic ethers, such as tetrahydrofuran, 2-methyltetrahydrofuran, 1,4-dioxane, etc.; linear ethers, such as 1,2-dimethoxyethane, 1,2-diethoxyethane, 1,2-dibutoxyethane, etc.; amides, such as dimethylformamide, etc.; sulfones, such as sulfolane, etc.; and lactones, such as γ-butyrolactone, γ-valerolactone, α-angelicalactone, etc.

In general, for the purpose of achieving appropriate physical properties, the above-described nonaqueous solvents are mixed and used. Suitable examples of a combination thereof include a combination of a cyclic carbonate and a linear carbonate, a combination of a cyclic carbonate and a linear carboxylic acid ester, a combination of a cyclic carbonate, a linear carbonate, and a lactone, a combination of a cyclic carbonate, a linear carbonate, and an ether, a combination of a cyclic carbonate, a linear carbonate, and a linear carboxylic acid ester, and the like.

For the purpose of improving the electrochemical characteristics in a much broader temperature range, it is preferable to further add other additives in the nonaqueous electrolytic solution.

Specific examples of the other additives include the following compounds of (A) to (J).

(A) One or more nitriles selected from acetonitrile, propionitrile, succinonitrile, glutaronitrile, adiponitrile, and pimelonitrile.

(B) Aromatic compounds having a branched alkyl group, such as cyclohexylbenzene, a fluorocyclohexylbenzene compound (e.g., 1-fluoro-2-cyclohexylbenzene, 1-fluoro-3-cyclohexylbenzene, and 1-fluoro-4-cyclohexylbenzene), tert-butylbenzene, tert-amylbenzene, 1-fluoro-4-tert-butylbenzene, etc.; and aromatic compounds, such as biphenyl, terphenyl (including o-, m-, and p-forms), diphenyl ether, fluorobenzene, difluorobenzene (including o-, m-, and p-forms), anisole, 2,4-difluoroanisole, a partial hydride of terphenyl (e.g., 1,2-dicyclohexylbenzene, 2-phenylbicyclohexyl, 1,2-diphenylcyclohexane, and o-cyclohexylbiphenyl), etc.

(C) One or more isocyanate compounds selected from methyl isocyanate, ethyl isocyanate, butyl isocyanate, phenyl isocyanate, tetramethylene diisocyanate, hexamethylene diisocyanate, octamethylene diisocyanate, 1,4-phenylene diisocyanate, 2-isocyanatoethyl acrylate, and 2-isocyanatoethyl methacrylate.

(D) One or more triple bond-containing compounds selected from 2-propynyl methyl carbonate, 2-propynyl acetate, 2-propynyl formate, 2-propynyl methacrylate, 2-propynyl methanesulfonate, 2-propynyl vinylsulfonate, 2-propynyl 2-(methanesulfonyloxy)propionate, di(2-propynyl) oxalate, methyl 2-propynyloxalate, ethyl 2-propynyloxalate, di(2-propynyl) glutarate, 2-butyne-1,4-diyl dimethanesulfonate, 2-butyne-1,4-diyl diformate, and 2,4-hexadiyne-1,6-diyl dimethanesulfonate.

(E) One or more S=O group-containing compounds selected from sultones, such as 1,3-propanesultone, 1,3-butanesultone, 2,4-butanesultone, 1,4-butanesultone, 1,3-propenesultone, 2,2-dioxide-1,2-oxathiolan-4-yl acetate, 5,5-dimethyl-1,2-oxathiolan-4-one, 2,2-dioxide, etc.; cyclic sulfites, such as ethylene sulfite, hexahydrobenzo[1,3,2]dioxathiolane-2-oxide (also referred to as 1,2-cyclohexanediol cyclic sulfite), 5-vinyl-hexahydro-1,3,2-benzodioxathiol-2-oxide, etc.; sulfonic acid esters, such as butane-2,3-diyl dimethanesulfonate, butane-1,4-diyl dimethanesulfonate, methylene methanedisulfonate, etc.; and vinylsulfone compounds, such as divinylsulfone, 1,2-bis(vinylsulfonyl)ethane, bis(2-vinylsulfonylethyl) ether, etc.

(F) One or more cyclic acetal compounds selected from 1,3-dioxolane, 1,3-dioxane, and 1,3,5-trioxane.

(G) One or more phosphorus-containing compounds selected from trimethyl phosphate, tributyl phosphate, trioctyl phosphate, tris(2,2,2-trifluoroethyl)phosphate, bis(2,2,2-trifluoroethyl)methyl phosphate, bis(2,2,2-trifluoroethyl) ethyl phosphate, bis(2,2,2-trifluoroethyl) 2,2-difluoroethyl phosphate, bis(2,2,2-trifluoroethyl) 2,2,3,3-tetrafluoropropyl phosphate, bis(2,2-difluoroethyl) 2,2,2-trifluoroethyl phosphate, bis(2,2,3,3-tetrafluoropropyl) 2,2,2-trifluoroethyl phosphate, (2,2,2-trifluoroethyl) (2,2,3,3-tetrafluoropropyl)methyl phosphate, tris(1,1,1,3,3,3,-hexafluoropropan-2-yl)phosphate, methyl methylenebisphosphonate, ethyl methylenebisphosphonate, methyl ethylenebisphosphonate, ethyl ethylenebisphosphonate, methyl butylenebisphosphonate, ethyl butylenebisphosphonate, methyl 2-(dimethylphosphoryl)acetate, ethyl 2-(dimethylphosphoryl)acetate, methyl 2-(diethylphosphoryl)acetate, ethyl 2-(diethylphosphoryl)acetate, 2-propynyl 2-(dimethylphosphoryl)acetate, 2-propynyl 2-(diethylphosphoryl)acetate, methyl 2-(dimethoxyphosphoryl)acetate, ethyl 2-(dimethoxyphosphoryl)acetate, methyl 2-(diethoxyphosphoryl)acetate, ethyl 2-(diethoxyphosphoryl)acetate, 2-propynyl 2-(dimethoxyphosphoryl)acetate, 2-propynyl 2-(diethoxyphosphoryl)acetate, methyl pyrophosphate, and ethyl pyrophosphate.

(H) One or more selected from linear carboxylic acid anhydrides, such as acetic anhydride, propionic anhydride, etc.; and cyclic acid anhydrides, such as succinic anhydride, maleic anhydride, 3-allylsuccinic anhydride, glutaric anhydride, itaconic anhydride, 3-sulfo-propionic anhydride, etc.

(I) One or more cyclic phosphazene compounds selected from methoxypentafluorocyclotriphosphazene, ethoxypentafluorocyclotriphosphazene, phenoxypentafluorocyclotriphosphazene, and ethoxyheptafluorocyclotetraphosphazene.

(J) One or more dialkyl oxalate compounds selected from dimethyl oxalate, diethyl oxalate, dipropyl oxalate, diisopropyl oxalate, dibutyl oxalate, dihexyl oxalate, dioctyl oxalate, didecyl oxalate, didodecyl oxalate, ethyl methyl oxalate, propyl methyl oxalate, butyl methyl oxalate, ethyl propyl oxalate, and ethyl butyl oxalate.

Of the foregoing, when at least one or more selected from the nitriles (A), the aromatic compounds (B), and the isocyanate compounds (C) are contained, the electrochemical characteristics are improved in a much broader temperature range, and hence, such is preferable.

Of the nitriles (A), one or more selected from succinonitrile, glutaronitrile, adiponitrile, and pimelonitrile are more preferable.

Of the aromatic compounds (B), one or more selected from biphenyl, terphenyl (including o-, m-, and p-forms), fluorobenzene, cyclohexylbenzene, tert-butylbenzene, and tert-amylbenzene are more preferable; and one or more selected from biphenyl, o-terphenyl, fluorobenzene, cyclohexylbenzene, and tert-amylbenzene are especially preferable.

Of the isocyanate compounds (C), one or more selected from hexamethylene diisocyanate, octamethylene diisocyanate, 2-isocyanatoethyl acrylate, and 2-isocyanatoethyl methacrylate are more preferable.

A content of the above-described compounds of (A) to (C) is preferably from 0.01 to 7% by mass in the nonaqueous electrolytic solution. When the content falls within the range, a surface film is sufficiently formed without causing an excessive increase of the thickness, and an effect for improving the electrochemical characteristics in a broad temperature range is increased. The content is more preferably 0.05% by mass or more, and still more preferably 0.1% by mass or more in the nonaqueous electrolytic solution, and an upper limit thereof is more preferably 5% by mass or less, and still more preferably 3% by mass or less.

In addition, when the triple bond-containing compound (D), the cyclic or linear S=O group-containing compound (E) selected from sultones, cyclic sulfites, sulfonic acid esters, and vinylsulfones, the cyclic acetal compound (F), the phosphorus-containing compound (G), the cyclic acid anhydride (H), the cyclic phosphazene compound (I), and the dialkyl oxalate compound (J) are contained, the electrochemical characteristics are improved in a much broader temperature range, and hence, such is preferable.

As the triple bond-containing compound (D), one or more selected from 2-propynyl methyl carbonate, 2-propynyl methacrylate, 2-propynyl methanesulfonate, 2-propynyl vinylsulfonate, 2-propynyl 2-(methanesulfonyloxy)propionate, di(2-propynyl) oxalate, methyl 2-propynyl oxalate, ethyl 2-propynyl oxalate, and 2-butyne-1,4-diyl dimethanesulfonate are preferable; and one or more selected from 2-propynyl methanesulfonate, 2-propynyl vinylsulfonate, 2-propynyl 2-(methanesulfonyloxy)propionate, di(2-propynyl) oxalate, and 2-butyne-1,4-diyl dimethanesulfonate are more preferable.

It is preferable to use the cyclic or linear S=O group-containing compound (E) selected from sultones, cyclic sulfites, sulfonic acid esters, and vinylsulfones (however, the triple bond-containing compound and the specified lithium salt represented by any of the foregoing general formulae are not included).

As the above-described cyclic S=O group-containing compound, there are suitably exemplified one or more selected from 1,3-propanesultone, 1,3-butanesultone, 1,4-butanesultone, 2,4-butanesultone, 1,3-propenesultone, 2,2-dioxide-1,2-oxathiolan-4-yl acetate, 5,5-dimethyl-1,2-oxathiolan-4-one 2,2-dioxide, methylene methanedisulfonate, ethylene sulfite, and 4-(methylsulfonylmethyl)-1,3,2-dioxathiolane 2-oxide.

In addition, as the linear S=O group-containing compound, there are suitably exemplified one or more selected from butane-2,3-diyl dimethanesulfonate, butane-1,4-diyl dimethanesulfonate, dimethyl methanedisulfonate, pentafluorophenyl methanesulfonate, divinylsulfone, and bis(2-vinylsulfonylethyl) ether.

Among the above-described cyclic or linear S=O group-containing compounds, one or more selected from 1,3-propanesultone, 1,4-butanesultone, 2,4-butanesultone, 2,2-dioxide-1,2-oxathiolan-4-yl acetate, 5,5-dimethyl-1,2-oxathiolan-4-one 2,2-dioxide, butane-2,3-diyl dimethanesulfonate, pentafluorophenyl methanesulfonate, and divinylsulfone are more preferable.

As the cyclic acetal compound (F), 1,3-dioxolane and 1,3-dioxane are preferable, and 1,3-dioxane is more preferable.

As the phosphorus-containing compound (G), tris(2,2,2-trifluoroethyl)phosphate, tris(1,1,1,3,3,3-hexafluoropropan-2-yl)phosphate, methyl 2-(dimethylphosphoryl)acetate, ethyl 2-(dimethylphosphoryl)acetate, methyl 2-(diethylphosphoryl)acetate, ethyl 2-(diethylphosphoryl)acetate, 2-propynyl 2-(dimethylphosphoryl)acetate, 2-propynyl 2-(diethylphosphoryl)acetate, methyl 2-(dimethoxyphosphoryl)acetate, ethyl 2-(dimethoxyphosphoryl)acetate, methyl 2-(diethoxyphosphoryl)acetate, ethyl 2-(diethoxyphosphoryl)acetate, 2-propynyl 2-(dimethoxyphosphoryl)acetate, and 2-propynyl 2-(diethoxyphosphoryl)acetate are preferable; and one or more selected from tris(2,2,2-trifluoroethyl)phosphate, tris(1,1,1,3,3,3-hexafluoropropan-2-yl)phosphate, ethyl 2-(diethylphosphoryl)acetate, 2-propynyl 2-(dimethylphosphoryl)acetate, 2-propynyl 2-(diethylphosphoryl)acetate, ethyl 2-(diethoxyphosphoryl)acetate, 2-propynyl 2-(dimethoxyphosphoryl)acetate, and 2-propynyl 2-(diethoxyphosphoryl)acetate are more preferable.

As the cyclic acid anhydride (H), succinic anhydride, maleic anhydride, and 3-allylsuccinic anhydride are preferable, and one or two selected from succinic anhydride and 3-allylsuccinic anhydride are more preferable.

As the cyclic phosphazene compound (I), cyclic phosphazene compounds, such as methoxypentafluorocyclotriphosphazene, ethoxypentafluorocyclotriphosphazene, phenoxypentafluorocyclotriphosphazene, etc., are preferable, and one or two selected from methoxypentafluorocyclotriphosphazene and ethoxypentafluorocyclotriphosphazene are more preferable.

As the dialkyl oxalate compound (J), one or more selected from dimethyl oxalate, diethyl oxalate, and ethyl methyl oxalate are preferable.

A content of the above-described compounds of (D) to (J) is preferably from 0.001 to 5% by mass in the nonaqueous electrolytic solution. When the content falls within the range, a surface film is sufficiently formed without causing an excessive increase of the thickness, and an effect for improving the electrochemical characteristics in a broad temperature range is increased. The content is more preferably 0.01% by mass or more, and still more preferably 0.1% by mass or more in the nonaqueous electrolytic solution, and an upper limit thereof is more preferably 3% by mass or less, and still more preferably 2% by mass or less.

[Electrolyte Salt]

As the electrolyte salt which is used in the present invention, there are suitably exemplified the following lithium salts.

As the lithium salt, there are suitably exemplified inorganic lithium salts, such as $LiPF_6$, $LiPO_2F_2$, $Li_2PO_3F$, $LiBF_4$, $LiClO_4$, $FSO_3Li$, $LiN(SO_2F)_2$, etc.; linear fluoroalkyl group-containing lithium salts, such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, etc.; cyclic fluoroalkylene group-containing lithium salts, such as $(CF_2)_2(SO_2)_2NLi$, $(CF_2)_3(SO_2)_2NLi$, etc.; and lithium salts having an oxalate complex as an anion, such as lithium bis[oxalate-O,O']borate (LiBOB), lithium difluoro[oxalate-O,O']borate, lithium difluorobis[oxalate-O,O']phosphate (LiPFO), lithium tetrafluoro[oxalate-O,O']phosphate, etc.; and these can be used solely or in admixture of two or more kinds thereof.

Of these, one or more selected from $LiPF_6$, $LiPO_2F_2$, $Li_2PO_3F$, $LiBF_4$, $FSO_3Li$, $LiN(SO_2F)_2$, $LiN(SO_2CF_3)_2$, $LiN(SO_2C_2F_5)_2$, lithium bis[oxalate-O,O']borate (LiBOB), lithium difluorobis[oxalate-O,O']phosphate (LiPFO), and lithium tetrafluoro[oxalate-O,O']phosphate are preferable; one or more selected from $LiPF_6$, $LiPO_2F_2$, $LiBF_4$, $FSO_3Li$, $LiN(SO_2CF_3)_2$, $LiN(SO_2F)_2$, lithium bis[oxalate-O,O']borate (LiBOB), and lithium difluorobis[oxalate-O,O']phosphate (LiPFO) are more preferable; and it is the most preferable to use $LiPF_6$.

In general, a concentration of the lithium salt is preferably 0.3 M or more, more preferably 0.7 M or more, and still more preferably 1.1 M or more relative to the above-described nonaqueous solvent. In addition, an upper limit thereof is preferably 2.5 M or less, more preferably 2.0 M or less, and still more preferably 1.6 M or less.

In addition, as a suitable combination of these lithium salts, it is more preferable to contain $LiPF_6$ and further contain one or more selected from $LiPO_2F_2$, $LiBF_4$, $FSO_3Li$, $LiN(SO_2F)_2$, lithium bis[oxalate-O,O']borate (LiBOB), and lithium difluorobis[oxalate-O,O']phosphate (LiPFO).

When a proportion of the lithium salt other than $LiPF_6$, which occupies in the nonaqueous solvent, is 0.001 M or more, an effect for improving the electrochemical characteristics at high temperatures is easily exhibited, and when it is 0.005 M or less, there is less concern that the effect for improving the electrochemical characteristics at high temperatures is lowered, and hence, such is preferable. The proportion of the lithium salt other than $LiPF_6$ is preferably 0.01 M or more, especially preferably 0.03 M or more, and most preferably 0.04 M or more. An upper limit thereof is more preferably 0.4 M or less, and especially preferably 0.2 M or less.

In the case where $LiPF_6$ is contained in the nonaqueous electrolytic solution, when a ratio of a molar concentration of the lithium salt which is used in the present invention to $LiPF_6$ is 0.0005 or more, an effect for improving the electrochemical characteristics at high temperatures is easily exhibited, and when it is 0.3 or less, there is less concern that the effect for improving the electrochemical characteristics at high temperatures is lowered, and hence, such is preferable. A lower limit thereof is more preferably 0.001 or more, and still more preferably 0.005 or more. In addition, an upper limit thereof is more preferably 0.2 or less, and still more preferably 0.1 or less.

[Production of Nonaqueous Electrolytic Solution]

The nonaqueous electrolytic solution of the present invention can be, for example, obtained by mixing the above-described nonaqueous solvents and adding the above-described electrolyte salt and the acyclic lithium salt represented by any of the foregoing general formula (I) or (II) or the acyclic lithium salt represented by any of the foregoing general formulae (XI) to (XIII) to the nonaqueous electrolytic solution.

At this time, the nonaqueous solvent used and the compounds added to the nonaqueous electrolytic solution are preferably purified previously to reduce as much as possible the content of impurities, in such an extent that does not extremely deteriorate the productivity.

The nonaqueous electrolytic solution of the present invention may be used in first to fourth energy storage devices shown below, in which the nonaqueous electrolytic solution may be used as the nonaqueous electrolyte not only in the form of a liquid but also in the form of gel. The nonaqueous electrolytic solution of the present invention may also be used for a solid polymer electrolyte. Among these, the nonaqueous electrolytic solution is preferably used in the first energy storage device using a lithium salt as the electrolyte salt (i.e., for a lithium battery) or in the fourth energy storage device (i.e., for a lithium ion capacitor), more preferably used in a lithium battery, and most suitably used in a lithium secondary battery.

First Energy Storage Device (Lithium Battery)

The lithium battery in the present specification is a generic name for a lithium primary battery and a lithium secondary battery. In the present specification, the term, lithium secondary battery, is used as a concept that includes a so-called lithium ion secondary battery. The lithium battery of the present invention contains a positive electrode, a negative electrode and the aforementioned nonaqueous electrolytic solution containing an electrolyte salt dissolved in a nonaqueous solvent. Other constitutional members used than the nonaqueous electrolytic solution, such as the positive electrode and the negative electrode, are not particularly limited.

For example, as the positive electrode active material for lithium secondary batteries, usable is a complex metal oxide of lithium and one or more selected from cobalt, manganese and nickel. One alone or two or more of these positive electrode active materials may be used here either singly or as combined.

The lithium complex metal oxide includes, for example, one or more selected from $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$, $LiNi_{1/2}Mn_{3/2}O_4$, and $LiCo_{0.98}Mg_{0.02}O_2$. These materials may be used as a combination, such as a combination of $LiCoO_2$ and $LiMn_2O_4$, a combination of $LiCoO_2$ and $LiNiO_2$, and a combination of $LiMn_2O_4$ and $LiNiO_2$.

For improving the safety on overcharging and the cycle property, and for enabling the use at a charge potential of 4.3 V or more, a part of the lithium complex metal oxide may be substituted with other elements. For example, a part of cobalt, manganese and nickel may be substituted with at least one or more elements of Sn, Mg, Fe, Ti, Al, Zr, Cr, V, Ga, Zn, Cu, Bi, Mo, La, etc.; or a part of O may be substituted with S or F; or the oxide may be coated with a compound containing any of such other elements.

Of those, preferred are lithium complex metal oxides, such as $LiCoO_2$, $LiMn_2O_4$ and $LiNiO_2$, with which the charge potential of the positive electrode in a fully-charged state can be used at 4.3 V or more based on Li; and more preferred are lithium complex metal oxides, such as solid solutions of $LiCo_{1-x}M_xO_2$ (where M is one or more elements selected from Sn, Mg, Fe, Ti, Al, Zr, Cr, V, Ga, Zn and Cu; 0.001≤x≤0.05), $LiCo_{1/3}Ni_{1/3}Mn_{1/3}O_2$, $LiNi_{0.5}Mn_{0.3}Co_{0.2}O_2$, $LiNi_{0.85}Co_{0.10}Al_{0.05}O_2$, $LiNi_{1/2}Mn_{3/2}O_4$, $Li_2MnO_3$ and $LiMO_2$ (where M is a transition metal, such as Co, Ni, Mn, Fe, etc.) that can be used at 4.4 V or more. The use of the lithium complex metal oxide capable of acting at a high charge voltage may worsen the electrochemical characteristics on using in a broad temperature range due to the reaction with the electrolytic solution on charging, but in the lithium secondary battery of the present invention, the electrochemical characteristics may be prevented from worsening.

In particular, a battery with a positive electrode containing Mn tends to have an increased resistance due to elution of Mn ions from the positive electrode, thereby providing the tendency of worsening the electrochemical characteristics on using in a broad temperature range. However, it is preferred that the lithium secondary battery of the present invention can prevent the electrochemical characteristics from worsening.

Furthermore, a lithium-containing olivine-type phosphate may also be used as the positive electrode active material. Especially preferred are lithium-containing olivine-type phosphates containing at least one or more selected from iron, cobalt, nickel and manganese. Specific examples thereof include one or more selected from $LiFePO_4$, $LiCoPO_4$, $LiNiPO_4$, and $LiMnPO_4$.

The lithium-containing olivine-type phosphates may be partly substituted with any other element. For example, a part of iron, cobalt, nickel, and manganese therein may be substituted with at least one or more elements selected from Co, Mn, Ni, Mg, Al, B, Ti, V, Nb, Cu, Zn, Mo, Ca, Sr, W, and Zr; or the phosphates may be coated with a compound containing any of these other elements or with a carbon material. Among those, $LiFePO_4$ and $LiMnPO_4$ are preferred.

The lithium-containing olivine-type phosphate may be used, for example, in combination with the above-mentioned positive electrode active material.

For the positive electrode for lithium primary batteries, there are mentioned oxides or chalcogen compounds of one or more metal elements, such as CuO, $Cu_2O$, $Ag_2O$, $Ag_2CrO_4$, CuS, $CuSO_4$, $TiO_2$, $TiS_2$, $SiO_2$, SnO, $V_2O_5$, $V_6O_{12}$, $VO_x$, $Nb_2O_5Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, FeO, $Fe_3O_4$, $Ni_2O_3$, NiO, $CoO_3$, CoO, etc.; sulfur compounds, such as $SO_2$, $SOCl_2$, etc.; carbon fluorides (graphite fluoride) represented by a general formula $(CF_x)_n$, etc. Of these, $MnO_2$, $V_2O_5$, graphite fluoride, and the like are preferable.

The case where a supernatant at the time of dispersing 10 g of the above-described positive electrode active material in 100 mL of distilled water has a pH of from 10.0 to 12.5 is preferable because an effect for improving the electrochemical characteristics in a much broader temperature range is easily obtained, and the case where the pH is from 10.5 to 12.0 is more preferable.

In addition, the case where Ni is contained as an element in the positive electrode is preferable because impurities in the positive electrode active material, such as LiOH, etc., tend to increase, so that an effect for improving the electrochemical characteristics in a much broader temperature range is easily obtained; the case where an atomic concentration of Ni in the positive electrode active material is from 5 to 25 atomic % is more preferable; and the case where it is from 8 to 21 atomic % is especially preferable.

An electroconductive agent of the positive electrode is not particularly limited so long as it is an electron-conductive material that does not undergo a chemical change. Examples thereof include graphites, such as natural graphite (e.g., flaky graphite, etc.), artificial graphite, etc.; one or more carbon blacks selected from acetylene black, Ketjen black, channel black, furnace black, lamp black, and thermal black; and the like. In addition, graphite and carbon black may be properly mixed and used. An addition amount of the electroconductive agent to the positive electrode mixture is preferably from 1 to 10% by mass, and especially preferably from 2 to 5% by mass.

The positive electrode can be fabricated by mixing the above-described positive electrode active material with an electroconductive agent, such as acetylene black, carbon black, etc., and a binder, such as polytetrafluoroethylene (PTFE), polyvinylidene fluoride (PVDF), a copolymer of styrene and butadiene (SBR), a copolymer of acrylonitrile and butadiene (NBR), carboxymethyl cellulose (CMC), an ethylene-propylene-diene terpolymer, etc., adding a high-boiling point solvent, such as 1-methyl-2-pyrrolidone, etc., thereto, followed by kneading to prepare a positive electrode mixture, coating this positive electrode mixture on a collector, such as an aluminum foil, stainless steel-made lath plate, etc., and drying and shaping the resultant under pressure, followed by heat treatment in vacuum at a temperature of from about 50° C. to 250° C. for about 2 hours.

A density of a portion of the positive electrode except for the collector is generally 1.5 g/cm$^3$ or more, and for the purpose of further increasing the capacity of the battery, the density is preferably 2 g/cm$^3$ or more, more preferably 3 g/cm$^3$ or more, and still more preferably 3.6 g/cm$^3$ or more. It is to be noted that an upper limit thereof is preferably 4 g/cm$^3$ or less.

Examples of a negative electrode active material for a lithium secondary battery include negative electrode active materials in which a charging potential in a fully-charged state is less than 1 V on the Li basis and negative electrode active materials in which a charging potential in a fully-charged state is 1 V or more on the Li basis.

Examples of the above-described negative electrode active material in which a charging potential in a fully-charged state is less than 1 V on the Li basis include lithium metal, lithium alloys, carbon materials capable of absorbing and releasing lithium [e.g., graphitizable carbon, non-graphitizable carbon having a spacing of the (002) plane of 0.37 nm or more, graphite having a spacing of the (002) plane of 0.34 nm or less, etc.], tin (elemental substance), tin compounds, silicon (elemental substance), silicon compounds, and the like; and examples of the above-described negative electrode active material in which a charging potential in a fully-charged state is 1 V or more on the Li basis include lithium titanate compounds, such as $Li_4Ti_5O_{12}$, etc., and the like. These negative electrode active materials can be used solely or in combination of two or more kinds thereof.

Of these, in absorbing and releasing ability of a lithium ion, the negative electrode active material in which a charging potential in a fully-charged state is less than 1 V on the Li basis is preferable; it is more preferable to use a high-crystalline carbon material, such as artificial graphite, natural graphite, etc.; and it is still more preferable to use a carbon material having a graphite-type crystal structure in which a lattice (002) spacing ($d_{002}$) is 0.340 nm (nanometers) or less, especially from 0.335 to 0.337 nm.

In particular, it is preferable to use an artificial graphite particle having a bulky structure in which plural flat graphite fine particles are mutually gathered or bound in non-parallel, or a particle prepared by subjecting flaky natural graphite to a spheroidizing treatment by repeatedly giving a mechanical action, such as compression force, frictional force, shear force, etc.

In a graphite crystal, when a ratio [I(110)/I(004)] of a peak intensity I(110) of the (110) plane to a peak intensity I(004) of the (004) plane, which is obtained from the X-ray diffraction measurement of a negative electrode sheet at the time of shaping under pressure of a portion of the negative electrode except for the collector in a density of 1.5 g/cm$^3$ or more, is 0.01 or more, the electrochemical characteristics in a much broader temperature range are improved, and hence, such is preferable; and the peak intensity ratio [I(110)/I(004)] is more preferably 0.05 or more, and still more preferably 0.1 or more. In addition, when excessively treated, there may be the case where the crystallinity is lowered, and the discharge capacity is lowered, and therefore, an upper limit of the peak intensity ratio [I(110)/I(004)] is preferably 0.5 or less, and more preferably 0.3 or less.

In addition, when the high-crystalline carbon material (core material) is coated with a carbon material that is more low-crystalline than the core material, the electrochemical characteristics in a broad temperature range become much more favorable, and hence, such is preferable. The crystallinity of the carbon material of the coating can be confirmed by TEM.

When the high-crystalline carbon material is used, there is a tendency that at the time of charging, it reacts with the nonaqueous electrolytic solution, thereby lowering the electrochemical characteristics at low temperatures or high temperatures due to an increase of the interfacial resistance; however, in the lithium secondary battery according to the present invention, the electrochemical characteristics in a broad temperature range become favorable.

The metal compound capable of absorbing and releasing lithium, serving as a negative electrode active material, includes compounds containing at least one metal element of Si, Ge, Sn, Pb, P, Sb, Bi, Al, Ga, In, Ti, Mn, Fe, Co, Ni, Cu, Zn, Ag, Mg, Sr, Ba, etc. The metal compound may be in any form including an elementary substance, an alloy, an oxide, a nitride, a sulfide, a boride and an alloy with lithium, and any of an elementary substance, an alloy, an oxide and an alloy with lithium is preferred since the battery capacity may be increased thereby. Above all, more preferred are those containing at least one element selected from Si, Ge and Sn, and even more preferred are those containing at least one element selected from Si and Sn, as capable of increasing the battery capacity.

The negative electrode may be formed in such a manner that the same electroconductive agent, binder and high-boiling point solvent as in the formation of the above-mentioned positive electrode are used and kneaded to provide a negative electrode mixture, and the negative electrode mixture is then applied onto a collector, such as a copper foil, dried, shaped under pressure, and then heat-treated in vacuum at a temperature of approximately from 50 to 250° C. for approximately 2 hours.

The density of the part except for the collector of the negative electrode may be generally at least 1.1 g/cm$^3$, and for further increasing the battery capacity, the density is preferably at least 1.5 g/cm$^3$, more preferably at least 1.7 g/cm$^3$. The upper limit thereof is preferably 2 g/cm$^3$ or less.

Examples of the negative electrode active material for a lithium primary battery include lithium metal and a lithium alloy.

The structure of the lithium battery is not particularly limited, and may be a coin-type battery, a cylinder-type battery, a square-shaped battery, a laminate-type battery or the like, each having a single-layered or multi-layered separator.

The separator for the battery is not particularly limited, and examples thereof used include a single-layered or laminated micro-porous film of polyolefin, such as polypropylene and polyethylene, as well as a woven fabric, a nonwoven fabric, etc.

The lithium secondary battery of the present invention has excellent electrochemical characteristics in a broad temperature range even when the final charging voltage is 4.2 V or more, and particularly 4.3 V or more, and furthermore the characteristics thereof are still good even at 4.4 V or more. The final discharging voltage may be generally 2.8 V or more, and further 2.5 V or more, and the final discharging voltage of the lithium secondary battery of the present invention may be 2.0 V or more. The current value is not specifically defined, but in general, the battery is used within a range of from 0.1 to 30 C. The lithium battery of the present invention can be charged/discharged at −40 to 100° C., preferably at −10 to 80° C.

In the present invention, as a countermeasure against the increase in the internal pressure of the lithium battery, such a method may be employed that a safety valve is provided in the battery cap, and a cutout is provided in the battery component, such as the battery can and the gasket. As a safety countermeasure against overcharging, a circuit cut-off mechanism capable of detecting the internal pressure of the battery to cut off the current may be provided in the battery cap.

Second Energy Storage Device (Electric Double-Layer Capacitor)

The energy storage device stores energy by utilizing the electric double layer capacitance in the interface between the electrolytic solution and the electrode. One example thereof of the present invention is an electric double layer capacitor. The most typical electrode active material used in the energy storage device is active carbon. The double layer capacitance increases almost in proportion to the surface area.

[Third Energy Storage Device]

The energy storage device stores energy by utilizing the doping/dedoping reaction of the electrode therein. Examples of the electrode active material used in the energy storage device include a metal oxide, such as ruthenium oxide, iridium oxide, tungsten oxide, molybdenum oxide and copper oxide, a π-conjugated polymer, such as polyacene and a polythiophene derivative. A capacitor that uses the electrode active material is capable of storing energy along with the doping/dedoping reaction at the electrode therein.

[Fourth Energy Storage Device (Lithium Ion Capacitor)]

The energy storage device stores energy by utilizing the lithium ion intercalation into a carbon material, such as graphite, as the negative electrode. The energy storage device may also be referred to as a lithium ion capacitor (LIC). Examples of the positive electrode include one utilizing an electric double layer between an active carbon electrode and an electrolytic solution therein, and one utilizing doping/dedoping reaction of a π-conjugated polymer electrode. The electrolytic solution contains at least a lithium salt, such as $LiPF_6$.

[Lithium Salt]

The novel lithium salt of the present invention is represented by any of the following general formulae (XII-2) and (XIII-3).

[Chem. 18]

$$[R^1-SO_3(BF_3)_{t_2}]Li \qquad (XII-2)$$

(In the formula, $R^1$ represents an alkyl group having from 1 to 6 carbon atoms, an alkenyl group having from 2 to 6 carbon atoms, an aryl group having from 6 to 12 carbon atoms, or a halogen atom; and $t_2$ is from 1.01 to 3.)

[Chem. 19]

$$[O_3S-R^2-SO_3(BF_3)_{u_1}]2Li \qquad (XIII-3)$$

(In the formula, $R^2$ represents an alkylene group having from 1 to 6 carbon atoms; and $u_1$ is from 2 to 6. At least one of hydrogen atoms which $R^2$ has may be substituted with a halogen atom.)

In the general formula (XII-2), a lower limit of $t_2$ is preferably 1.05 or more, and more preferably 1.1 or more, and an upper limit thereof is preferably 2 or less, and more preferably 1.7 or less.

Specific examples and suitable examples of $R^1$ of the general formula (XII-2) are the same as the specific examples and suitable examples of $R^1$ of the general formula (XI-1).

In the lithium salt represented by the general formula (XII-2), a binding mode between the sulfonate anion and the boron trifluoride molecule is not particularly limited, and various binding modes, such as a direct bond, a coordinate bond, etc., can be taken.

Suitable examples of the lithium salt represented by the foregoing general formula (XII-2) include the foregoing Compounds 1 to 30. Of these compounds, one or more selected from the foregoing Compounds 1 to 7, 11 to 16, 21, 23 to 26, 28, and 29 are preferable; and one or more selected from the foregoing Compound 1, Compound 2, Compound 4, Compound 11, Compound 13, Compound 15, Compound 21, Compound 23, and Compound 26 are more preferable. However, in the foregoing Compounds 1 to 30, $t_1$ corresponding to $t_2$ is from 1.01 to 3.

In addition, suitable examples of the lithium salt represented by the foregoing general formula (XIII-3) are described above.

The compound represented by the foregoing general formula (XII-2) or (XIII-3) can be synthesized by any of the following methods (a) to (c), but it should not be construed that the synthesis method is limited to these methods.

[Method (a)]

The method (a) is a method of allowing a lithium sulfonate salt and a boron trifluoride complex to react with each other in the presence or absence of a solvent. It is to be noted that the lithium sulfonate salt as a raw material can be synthesized by an existing method, for example, the method described in Tetrahedron Letters, Vol. 23, No. 43 (1983), page 4461.

In the reaction of the method (a), an amount of the boron trifluoride complex to be used is preferably from 0.8 to 10 moles, more preferably from 0.9 to 5 moles, and still more preferably from 1 to 3 moles per mole of the lithium sulfonate salt.

Examples of the boron trifluoride complex which is used for the method (a) include a boron trifluoride-diethyl ether complex, a boron trifluoride-tetrahydrofuran complex, a boron trifluoride-methanol complex, a boron trifluoride complex, a boron trifluoride-acetic acid complex, a boron trifluoride-phosphoric acid complex, a boron trifluoride-amine complex, a boron trifluoride-sulfide complex, and a boron trifluoride-$H_2O$ complex; and above all, from the viewpoint of easiness of removal, a boron trifluoride-diethyl ether complex, a boron trifluoride-tetrahydrofuran complex, and a boron trifluoride-methanol complex are preferable.

In the reaction of the method (a), although the reaction proceeds in the absence of a solvent, a solvent can be used so long as it is inert against the reaction. Examples of the solvent which is used include aliphatic hydrocarbons, such as heptane, cyclohexane, etc.; halogenated hydrocarbons, such as dichloromethane, dichloroethane, etc.; aromatic hydrocarbons, such as toluene, xylene, etc.; halogenated aromatic hydrocarbons, such as chlorobenzene, fluorobenzene, etc.; ethers, such as diisopropyl ether, dioxane, dimethoxyethane, etc.; esters, such as ethyl acetate, butyl acetate, dimethyl carbonate, diethyl carbonate, etc.; sulfoxides, such as dimethyl sulfoxide, sulfolane, etc.; amides, such as N,N-dimethylformamide, N,N-dimethylacetamide, etc.; and mixtures thereof. Of these, aromatic hydrocarbons and esters, such as toluene, ethyl acetate, dimethyl carbonate, etc., are preferable.

An amount of the above-described solvent to be used is preferably from 0 to 30 parts by mass, and more preferably from 1 to 10 parts by mass per part by mass of the lithium sulfonate salt.

In the reaction of the method (a), from the viewpoint of not lowering the reactivity, a lower limit of the reaction temperature is preferably 0° C. or higher, and more preferably 20° C. or higher. In addition, from the viewpoint of suppressing a side-reaction or decomposition of the product, an upper limit of the reaction temperature is preferably 150° C. or lower, and more preferably 100° C. or lower.

In addition, although the reaction time may be properly varied depending on the above-described reaction temperature or scale, when the reaction time is too short, unreacted substances remain, but conversely, when the reaction time is too long, there is a concern that the reaction product is decomposed, or a side-reaction is generated, and therefore, the reaction time is preferably from 0.1 to 24 hours, and more preferably from 0.2 to 12 hours.

[Method (b)]

The method (b) is a method of introducing boron trifluoride into a lithium sulfonate salt and allowing them to react with each other in the presence or absence of a solvent.

In the reaction of the method (b), an amount of the boron trifluoride to be used is preferably from 0.8 to 10 moles, more preferably from 0.9 to 5 moles, and still more preferably from 1 to 3 moles per mole of the lithium sulfonate salt.

In the reaction of the method (b), although the reaction proceeds in the absence of a solvent, a solvent can be used so long as it is inert against the reaction. Examples of the solvent which is used include the aliphatic hydrocarbons, halogenated hydrocarbons, aromatic hydrocarbons, halogenated aromatic hydrocarbons, ethers, sulfoxides, and their mixtures as described for the method (a). Of these, aromatic hydrocarbons and esters, such as toluene, ethyl acetate, dimethyl carbonate, etc., are preferable.

An amount of the above-described solvent to be used is preferably from 0 to 30 parts by mass, and more preferably from 1 to 10 parts by mass per part by mass of the lithium sulfonate salt.

In the reaction of the method (b), a lower limit of the reaction temperature is preferably −20° C. or higher, and from the viewpoint of not lowering the reactivity, it is more preferably 0° C. or higher. In addition, from the viewpoint of suppressing a side-reaction or decomposition of the product, an upper limit of the reaction temperature is preferably 100° C., and more preferably 80° C. or lower.

Although the reaction time of the method (b) may be properly varied depending on the reaction temperature or scale, when the reaction time is too short, unreacted substances remain, but conversely, when the reaction time is too long, there is a concern that the reaction product is decomposed, or a side-reaction is generated, and therefore, the reaction time is preferably from 0.1 to 12 hours, and more preferably from 0.2 to 6 hours.

A content molar number of the boron trifluoride molecule to be contained in the obtained lithium salt to one mole of the sulfonate anion can be determined by means of quantitative measurement by $^1$H-NMR and $^{19}$F-NMR.

[Method (c)]

The method (c) is a method of allowing lithium tetrafluoroborate and a silyl sulfonate compound to react with each other in the presence or absence of a solvent.

In the reaction of the method (c), an amount of the silyl sulfonate compound to be used is preferably from 0.8 to 10 moles, more preferably from 0.9 to 5 moles, and still more preferably from 1 to 3 moles per mole of lithium hexafluorophosphate or lithium hexafluoroarsenate.

Examples of the silyl sulfonate compound which is used for the method (c) include trimethylsilyl methanesulfonate, trimethylsilyl ethanesulfonate, trimethylsilyl propane-2-sulfonate, trimethylsilyl 4-methylbenzenesulfonate, triethylsilyl methanesulfonate, and the like.

In the reaction of the method (c), although the reaction proceeds in the absence of a solvent, a solvent can be used so long as it is inert against the reaction. Examples of the solvent which is used include the aliphatic hydrocarbons, halogenated hydrocarbons, aromatic hydrocarbons, halogenated aromatic hydrocarbons, ethers, sulfoxides, and their mixtures as described for the method (a). Of these, aromatic hydrocarbons and esters, such as toluene, ethyl acetate, dimethyl carbonate, etc., are preferable.

An amount of the above-described solvent to be used is preferably from 0 to 30 parts by mass, and more preferably from to 10 parts by mass per part by mass of lithium tetrafluoroborate.

In the reaction of the method (c), from the viewpoint of not lowering the reactivity, a lower limit of the reaction temperature is preferably 0° C. or higher, and more preferably 30° C. or higher. In addition, from the viewpoint of suppressing a side-reaction or decomposition of the product, an upper limit of the reaction temperature is preferably 150° C. or lower, and more preferably 100° C. or lower.

In addition, although the reaction time may be properly varied depending on the above-described reaction temperature or scale, when the reaction time is too short, unreacted substances remain, but conversely, when the reaction time is too long, there is a concern that the reaction product is decomposed, or a side-reaction is generated, and therefore, the reaction time is preferably from 0.1 to 24 hours, and more preferably from 0.2 to 12 hours.

EXAMPLES

Examples of an electrolytic solution using the lithium salt of the present invention and Synthesis Examples of a compound are hereunder described, but it should not be construed that the present invention is limited to these Examples and Synthesis Examples.

A. Next, results of addition of the lithium salt represented by the general formula (XI-1) or (XIII-1) are described in detail by reference to the Examples.

Examples A-1 to A-34 and Comparative Example A-1

Production of Lithium Ion Secondary Battery

94% by mass of $LiNi_{1/3}Mn_{1/3}Co_{1/3}O_2$ (positive electrode active material; a supernatant at the time of dispersing 10 g of the positive electrode active material in 100 mL of distilled water had a pH of 10.8) and 3% by mass of acetylene black (electroconductive agent) were mixed and then added to and mixed with a solution which had been prepared by dissolving 3% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by punching out in a prescribed size, thereby fabricating a positive electrode sheet. A density of a portion of the positive electrode except for the collector was 3.6 g/cm$^3$.

In addition, 95% by mass of artificial graphite ($d_{002}$=0.335 nm, negative electrode active material) was added to and mixed with a solution which had been prepared by dissolving 5% by mass of polyvinylidene fluoride (binder) in 1-methyl-2-pyrrolidone in advance, thereby preparing a negative electrode mixture paste. This negative electrode mixture paste was applied onto one surface of a copper foil (collector), dried, and treated under pressure, followed by punching out in a prescribed size, thereby fabricating a negative electrode sheet. A density of a portion of the negative electrode except for the collector was 1.5 g/cm$^3$. In addition, this electrode sheet was analyzed by means of X-ray diffraction, and as a result, a ratio [I(110)/I(004)] of a peak intensity I(110) of the (110) plane to a peak intensity I(004) of the (004) plane of the graphite crystal was found to be 0.1.

Then, the positive electrode sheet, a microporous polyethylene film-made separator, and the negative electrode sheet were laminated in this order, and a nonaqueous electrolytic solution having a composition shown in each of Tables 1 to 3 was added thereto, thereby fabricating a 2032 coin-type battery.

It is to be noted that in the composition of the electrolyte salt, LiBOB is an abbreviation of lithium bis[oxalate-O,O'] borate, and LiPFO is an abbreviation of lithium difluorobis [oxalate-O,O']phosphate. In the following tables, the same is also applicable.

[Evaluation of Low-Temperature Properties after High-Temperature Charging Storage]
<Initial Discharge Capacity>

Ina thermostatic chamber at 25° C., the coin-type battery fabricated by the above-described method was charged up to a final voltage of 4.2 V with a constant current of 1 C and under a constant voltage for 3 hours, the temperature of the thermostatic chamber was then lowered down to 0° C., and the battery was discharged down to a final voltage of 2.75 V with a constant current of 1 C, thereby determining an initial discharge capacity of the battery at 0° C.

<High-Temperature Charging Storage Test>

Subsequently, in a thermostatic chamber at 60° C., this coin-type battery was charged up to a final voltage of 4.2 V for 3 hours with a constant current of 1 C and a constant voltage and then stored for 7 days in a state of being kept at 4.2 V. Thereafter, the battery was placed in a thermostatic chamber at 25° C. and then once discharged under a constant current of 1 C to a final voltage of 2.75 V.

<Discharge Capacity after High-Temperature Charging Storage>

Furthermore, a discharge capacity at 0° C. after high-temperature charging storage was determined in the same manner as the measurement of the initial discharge capacity.

<Low-Temperature Properties after High-Temperature Charging Storage>

Low-temperature properties after high-temperature charging storage were determined from the following 0° C. discharge capacity retention rate.

0° C. Discharge capacity retention rate after high-temperature charging storage (%)=(Discharge capacity at 0° C. after high-temperature charging storage)/(Initial discharge capacity at 0° C.)×100

<High-Temperature Cycle Property>

In a thermostatic chamber at 60° C., the battery fabricated by the above-described method was treated by repeating a cycle of charging up to a final voltage of 4.2 V with a constant current of 1 C and under a constant voltage for 3 hours and subsequently discharging down to a discharge voltage of 3.0 V with a constant current of 1 C, until it reached 200 cycles. Then, a discharge capacity retention rate after cycling was determined according to the following equation.

Discharge capacity retention rate (%)=(Discharge capacity after 200 cycles)/(Discharge capacity at 1st cycle)×100

The battery characteristics are shown in Tables 1 to 3.

It is to be noted that the term "Other additives" in Table 3 means the "other additives" as described in the specification, namely a compound of any group selected from the nitrile (A), the aromatic compound (B), the isocyanate compound (C), the triple bond-containing compound (D), the S=O group-containing compound (E), the cyclic acetal compound (F), the phosphorus-containing compound (G), and the cyclic acid anhydride (H).

TABLE 1

| | Composition of electrolyte salt Composition of nonaqueous electrolytic solution (volume ratio of solvent) | Lithium salt (I) or (II) | | | 0° C. Discharge capacity retention rate after high-temperature charging storage at 60° C. (%) |
|---|---|---|---|---|---|
| | | Kind | Content in nonaqueous electrolytic solution (% by mass) | Molar concentration ratio of Li salt (I) or (II) to LiPF6 | |
| Example A-1 | 1.2M LiPF6 EC/DMC/MEC (30/40/30) | $CH_3-\overset{O}{\underset{O}{\overset{\|}{S}}}-O-BF_3\ Li$ | 0.5 | 0.031 | 76 |
| Example A-2 | 1.2M LiPF6 EC/MEC (30/70) | | 0.5 | 0.031 | 72 |
| Example A-3 | 1.2M LiPF6 EC/VC/DMC/MEC (29/1/40/30) | | 0.01 | 0.006 | 74 |

TABLE 1-continued

| | Composition of electrolyte salt Composition of nonaqueous electrolytic solution (volume ratio of solvent) | Lithium salt (I) or (II) | | 0° C. Discharge capacity retention rate after high-temperature charging storage at 60° C. (%) |
|---|---|---|---|---|
| | | Kind | Content in nonaqueous electrolytic solution (% by mass) / Molar concentration ratio of Li salt (I) or (II) to LiPF6 | |
| Example A-4 | 1.2M LiPF6 EC/VC/DMC/MEC (29/1/40/30) | | 0.5 / 0.031 | 80 |
| Example A-5 | 1.2M LiPF6 EC/VC/DMC/MEC (29/1/40/30) | | 2 / 0.12 | 77 |
| Example A-6 | 1.2M LiPF6 EC/VC/DMC/MEC (29/1/40/30) | | 4 / 0.25 | 75 |

TABLE 2

| | Composition of electrolyte salt Composition of nonaqueous electrolytic solution (volume ratio of solvent) | Lithium salt (I) or (II) Kind | Content in nonaqueous electrolytic solution (% by mass) | 0° C. Discharge capacity retention rate after high-temperature charging storage at 60° C. (%) |
|---|---|---|---|---|
| Example A-7 | 1.2M LiPF6 EC/VC/DMC/MEC (29/1/40/30) | 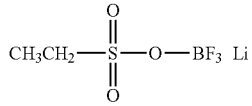 CH₃CH₂—S(=O)(=O)—O—BF₃ Li | 0.5 | 79 |
| Example A-8 | 1.2M LiPF6 EC/VC/DMC/MEC (29/1/40/30) | 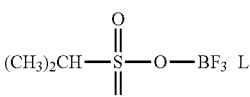 (CH₃)₂CH—S(=O)(=O)—O—BF₃ Li | 0.5 | 78 |
| Example A-9 | 1.2M LiPF6 EC/VC/DMC/MEC (29/1/40/30) | 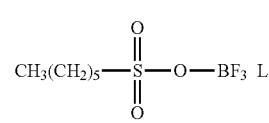 CH₃(CH₂)₅—S(=O)(=O)—O—BF₃ Li | 0.5 | 76 |
| Example A-10 | 1.2M LiPF6 EC/VC/DMC/MEC (29/1/40/30) | 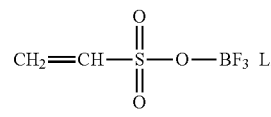 CH₂=CH—S(=O)(=O)—O—BF₃ Li | 0.5 | 75 |
| Example A-11 | 1.2M LiPF6 EC/VC/DMC/MEC (29/1/40/30) | 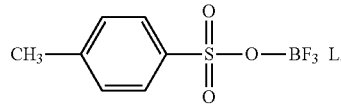 CH₃—C₆H₄—S(=O)(=O)—O—BF₃ Li | 0.5 | 74 |
| Example A-12 | 1.2M LiPF6 EC/VC/DMC/MEC (29/1/40/30) | 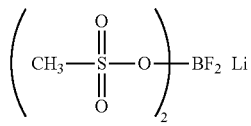 (CH₃—S(=O)(=O)—O—)₂BF₂ Li | 0.5 | 76 |
| Example A-13 | 1.2M LiPF6 EC/VC/DMC/MEC (29/1/40/30) | 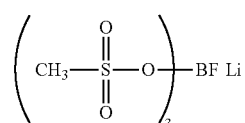 (CH₃—S(=O)(=O)—O—)₃BF Li | 0.5 | 74 |

TABLE 2-continued

| | Composition of electrolyte salt Composition of nonaqueous electrolytic solution (volume ratio of solvent) | Lithium salt (I) or (II) | | 0° C. Discharge capacity retention rate after high-temperature charging storage at 60° C. (%) |
|---|---|---|---|---|
| | | Kind | Content in nonaqueous electrolytic solution (% by mass) | |
| Example A-14 | 1.2M LiPF6 EC/VC/DMC/MEC (29/1/40/30) | 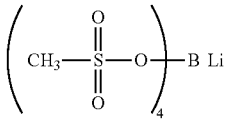 | 0.5 | 71 |
| Example A-15 | 1.2M LiPF6 EC/VC/DMC/MEC (29/1/40/30) | 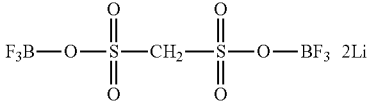 | 0.5 | 77 |
| Example A-16 | 1.2M LiPF6 EC/VC/DMC/MEC (29/1/40/30) | 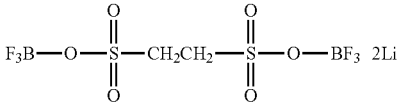 | 0.5 | 75 |
| Example A-17 | 1.2M LiPF6 EC/VC/DMC/MEC (29/1/40/30) | 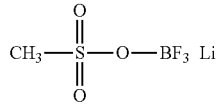 | 0.5 | 82 |
| Example A-18 | 1.2M LiPF6 + 0.05M LiBF4 EC/FEC/VC/DMC/MEC (19/10/1/40/30) | 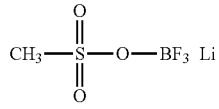 | 0.5 | 84 |
| Example A-19 | 1.2M LiPF6 + 0.05M LiBOB EC/FEC/VC/DMC/MEC (19/10/1/40/30) | 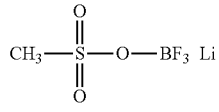 | 0.5 | 86 |
| Example A-20 | 1.2M LiPF6 + 0.05M LiPO2F2 EC/FEC/VC/DMC/MEC (19/10/1/40/30) | 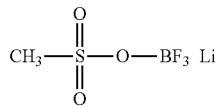 | 0.5 | 85 |
| Example A-21 | 1.2M LiPF6 + 0.05M LiPFO EC/FEC/VC/DMC/MEC (19/10/1/40/30) | 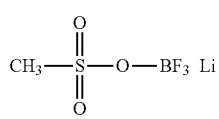 | 0.5 | 87 |
| Example A-22 | 1.2M LiPF6 + 0.05M FSO3Li EC/FEC/VC/DMC/MEC (19/10/1/40/30) | 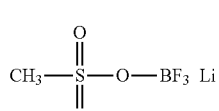 | 0.5 | 88 |

TABLE 3

| | Composition of electrolyte salt Composition of nonaqueous electrolytic solution (volume ratio of solvent) | Lithium salt (I) or (II) Kind | Content in nonaqueous electrolytic solution (% by mass) | Other additives Group | Content in nonaqueous electrolytic solution (% by mass) | 0° C. Discharge capacity retention rate after high-temperature charging storage at 60° C. (%) | Discharge capacity retention rate after 200 cycles at 60° C. (%) |
|---|---|---|---|---|---|---|---|
| Example A-23 | 1.2M LiPF6 EC/VC/DMC/MEC (29/1/40/30) | $CH_3\text{—}\overset{\overset{O}{\|}}{\underset{\underset{O}{\|}}{S}}\text{—}O\text{—}BF_3\ Li$ | 0.5 | A | Adiponitrile (1) | 84 | 77 |
| Example A-24 | | | | B | Cyclohexylbenzene (2) + o-Terphenyl (1) | 83 | 72 |
| Example A-25 | | | | C | 1,6-Hexamethylene diisocyanate (0.5) | 85 | 81 |
| Example A-26 | | | | C | 1,6-Hexamethylene diisocyanate (2) | 83 | 79 |
| Example A-27 | | | | D | 2-Butyne-1,4-diyl dimethanesulfonate (0.5) | 87 | 83 |
| Example A-28 | | | | D | 2-Butyne-1,4-diyl dimethanesulfonate (1) | 87 | 82 |
| Example A-29 | | | | E | 5,5-Dimethyl-1,2-oxathiolan-4-one 2,2-dioxide (0.5) | 84 | 82 |
| Example A-30 | | | | F | 1,3-Dioxane (1) | 84 | 82 |
| Example A-31 | | | | G | 2-Propynyl 2-(diethylphosphoryl)acetate (0.5) | 85 | 80 |
| Example A-32 | | | | G | 2-Propynyl 2-(diethylphosphoryl)acetate (1.5) | 86 | 81 |
| Example A-33 | | | | G | 2-Propynyl 2-(diethoxyphosphoryl)acetate (1.5) | 87 | 82 |
| Example A-34 | | | | H | 3-Allylsuccinic anhydride (1) | 85 | 81 |
| Comparative Example A-1 | | None | — | — | — | 65 | 66 |

Examples A-35 to A-36 and Comparative Example A-2

A negative electrode sheet was fabricated by using silicon (elemental substance) (negative electrode active material) in place of the negative electrode active material used in Example A-1. 80% by mass of silicon (elemental substance) and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. A coin-type battery was fabricated in the same manner as that in Example A-1, except that this negative electrode mixture paste was applied onto a copper foil (collector), dried, and treated under pressure, followed by punching out in a prescribed size, thereby fabricating a negative electrode sheet, and that the composition of the nonaqueous electrolytic solution was changed to a prescribed composition, and the battery was evaluated. The results are shown in Table 4.

TABLE 4

| | Composition of electrolyte salt Composition of nonaqueous electrolytic solution (volume ratio of solvent) | Lithium salt (I) or (II) Kind | Content in nonaqueous electrolytic solution (% by mass) | Other additives Group | Content in nonaqueous electrolytic solution (% by mass) | 0° C. Discharge capacity retention rate after high-temperature charging storage at 60 °C. (%) |
|---|---|---|---|---|---|---|
| Example A-35 | 1.2M LiPF6 PC/FEC/DMC/MEC (15/15/40/30) | $CH_3\text{—}\overset{\overset{O}{\|}}{\underset{\underset{O}{\|}}{S}}\text{—}O\text{—}BF_3\ Li$ | 0.5 | D | 2-Butyne-1,4-diyl dimethanesulfonate (1) | 74 |
| Example A-36 | | | | G | 2-Propynyl 2-(diethylphosphoryl)acetate (1) | 75 |
| Comparative Example A-2 | 1.2M LiPF6 PC/FEC/DMC/MEC (15/15/40/30) | None | — | — | — | 49 |

Examples A-37 to A-40 and Comparative Example A-3

A negative electrode sheet was fabricated by using lithium titanate $Li_4Ti_5O_{12}$ (negative electrode active material) in place of the negative electrode active material used in Example A-1. 80% by mass of lithium titanate $Li_4Ti_5O_{12}$ and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. A coin-type battery was fabricated in the same manner as that in Example A-1, except that this negative electrode mixture paste was applied onto a copper foil (collector), dried, and treated under pressure, followed by punching out in a prescribed size, thereby fabricating a negative electrode sheet; that in evaluating the battery, the final charging voltage and the final discharging voltage were set to 2.8 V and 1.2 V, respectively; and that the composition of the nonaqueous electrolytic solution was changed to a prescribed composition, and the battery was evaluated. The results are shown in Table 5.

TABLE 5

| | Composition of electrolyte salt | Lithium salt (I) or (II) | | Other additives | | 0° C. Discharge |
|---|---|---|---|---|---|---|
| | Composition of nonaqueous electrolytic solution (volume ratio of solvent) | Kind | Content in nonaqueous electrolytic solution (% by mass) | Group | Content in nonaqueous electrolytic solution (% by mass) | capacity retention rate after high-temperature charging storage at 60° C. (%) |
| Example A-37 | 1.2M LiPF6 PC/DEC (30/70) | $CH_3-\underset{\underset{O}{\|}}{\overset{\overset{O}{\|}}{S}}-O-BF_3\ Li$ | 0.5 | D | Di (2-propynyl) oxalate (0.5) | 90 |
| Example A-38 | | | | E | 2,4-Butanesultone (0.5) | 91 |
| Example A-39 | | | | J | Dimethyl oxalate | 89 |
| Example A-40 | 1.2M LiPF6 PC/DMC/MEC (30/40/30) | | | J | Dimethyl oxalate | 91 |
| Comparative Example A-3 | 1.2M LiPF6 PC/DEC (30/70) | None | — | — | — | 66 |

Examples A-41 to A-42 and Comparative Example A-4

A positive electrode sheet was fabricated by using $LiFePO_4$ (positive electrode active material) coated with amorphous carbon in place of the positive electrode active material used in Example A-1. 90% by mass of $LiFePO_4$ coated with amorphous carbon and 5% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a positive electrode mixture paste. A coin-type battery was fabricated in the same manner as that in Example A-1, except that this positive electrode mixture paste was applied onto an aluminum foil (collector), dried, and treated under pressure, followed by punching out in a prescribed size, thereby fabricating a positive electrode sheet; that in evaluating the battery, the final charging voltage and the final discharging voltage were set to 3.6 V and 2.0 V, respectively; and that the composition of the nonaqueous electrolytic solution was changed to a prescribed composition, and the battery was evaluated. The results are shown in Table 6.

TABLE 6

| | Composition of electrolyte salt Composition of nonaqueous electrolytic solution (volume ratio of solvent) | Lithium salt (I) or (II) Kind | Content in nonaqueous electrolytic solution (% by mass) | Other additives Group | Content in nonaqueous electrolytic solution (% by mass) | 0° C. Discharge capacity retention rate after high-temperature charging storage at 60° C. (%) |
|---|---|---|---|---|---|---|
| Example A-41 | 1.2M LiPF6 EC/VC/DMC/MEC (29/1/40/30) | $CH_3-\overset{\overset{O}{\|}}{\underset{\underset{O}{\|}}{S}}-O-BF_3 \ Li$ | 0.5 | D | 2-Butyne-1,4-diyl dimethanesulfonate (1) | 87 |
| Example A-42 | | | | D | Methyl 2-propynyl carbonate (0.5) | 88 |
| Comparative Example A-4 | | None | — | — | — | 62 |

In all of the lithium secondary batteries of the foregoing Examples A-1 to A-42, the electrochemical characteristics in a broad temperature range are remarkably improved as compared with the lithium secondary battery of Comparative Example A-1 in the case of not adding the lithium salt represented by the general formula (XI-1) or (XIII-1) in the nonaqueous electrolytic solution of the present invention. From the foregoing, it has been clarified that the advantageous effect of the present invention is a peculiar effect to the case of containing the specified lithium salt of the invention of the present application in an amount of from 0.001 to 5% by mass in the nonaqueous electrolytic solution of an electrolyte salt dissolved in a nonaqueous solvent. In addition, the discharge capacity retention rate of the lithium secondary battery fabricated in Example A-4 (other additives were not added) after 200 cycles at 60° C. is 76%, and similar to Examples A-23 to A-34 (other additives were added), the discharge capacity retention rate after 200 cycles at 60° C. was also remarkably improved as compared with Comparative Example A-1.

In addition, from comparison between Examples A-35 to A-36 and Comparative Example A-2 and comparison between Examples A-37 to A-40 and Comparative Example A-3 as well as between Examples A-41 to A-42 and Comparative Example A-4, the same effect is observed in the case of using silicon (elemental substance) Si or lithium titanate for the negative electrode and the case of using a lithium-containing olivine-type iron phosphate salt for the positive electrode, and therefore, it is clear that this effect is not an effect relying upon a specified positive electrode or negative electrode.

Furthermore, the nonaqueous electrolytic solutions obtained in Examples A-1 to A-42 also have an effect for improving discharging properties of a lithium primary battery in a broad temperature range.

B. Next, an effect by addition of the lithium salt represented by the general formula (XI-2) or (XIII-2) is described in detail by reference to the Examples.

Examples B-1 to B-32 and Comparative Example B-1

Production of Lithium Ion Secondary Battery

94% by mass of $LiNi_{0.85}CO_{0.85}Al_{0.05}O_2$ (positive electrode active material; a supernatant at the time of dispersing 10 g of the positive electrode active material in 100 mL of distilled water had a pH of 11.8) and 3% by mass of acetylene black (electroconductive agent) were mixed and then added to and mixed with a solution which had been prepared by dissolving 3% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by punching out in a prescribed size, thereby fabricating a positive electrode sheet. A density of a portion of the positive electrode except for the collector was 3.6 $g/cm^3$.

In addition, by using artificial graphite ($d_{002}$=0.335 nm, negative electrode active material), a negative electrode sheet (peak intensity ratio [I(110)/I(004)]=0.1) was fabricated in the same manner as that in Example A-1. Then, the positive electrode sheet, a microporous polyethylene film-made separator, and the negative electrode sheet were laminated in this order, and a nonaqueous electrolytic solution having a composition shown in each of Tables 7 to 9 was added thereto, thereby fabricating a 2032 coin-type battery.

[Evaluation of Low-Temperature Properties after High-Temperature Charging Storage]

The initial discharge capacity, the high-temperature charging storage test, the discharge capacity after high-temperature charging storage, and the low-temperature properties after high-temperature charging storage were evaluated in the same manners as those in Example A-1.

[Evaluation of Low-Temperature Properties after High-Temperature Cycle]

In a thermostatic chamber at 45° C., the battery fabricated by the above-described method was treated by repeating a cycle of charging up to a final voltage of 4.3 V with a constant current of 1 C and under a constant voltage for 3 hours and subsequently discharging to a discharge voltage of 3.0 V with a constant current of 1 C, until it reached 200 cycles. Then, the low-temperature properties after high-temperature cycle were determined in the same manner as described above from the following 0° C. discharge capacity retention rate.

0° C. Discharge capacity retention rate after high-temperature cycle (%)=(Discharge capacity at 0° C. after high-temperature cycle)/(Initial discharge capacity at 0° C.)×100

Battery characteristics are shown in Tables 7 to 9.

TABLE 7

| | Composition of electrolyte salt Composition of nonaqueous electrolytic solution (volume ratio of solvent) | Lithium salt (I) or (II) | | 0° C. Discharge capacity retention rate after high-temperature charging storage (%) |
|---|---|---|---|---|
| | | Kind | Addition amount (content in nonaqueous electrolytic solution) (% by mass) | |
| Example B-1 | 1.2M LiPF6 EC/DMC/MEC (30/40/30) | $CH_3-\underset{\underset{O}{\|}}{\overset{\overset{O}{\|}}{S}}-O-PF_5\ Li$ | 0.5 | 73 |
| Example B-2 | 1.2M LiPF6 EC/MEC (30/70) | | 0.5 | 70 |
| Example B-3 | 1.2M LiPF6 EC/VC/DMC/MEC (29/1/40/30) | | 0.01 | 71 |
| Example B-4 | 1.2M LiPF6 EC/VC/DMC/MEC (29/1/40/30) | | 0.5 | 76 |
| Example B-5 | 1.2M LiPF6 EC/VC/DMC/MEC (29/1/40/30) | | 2 | 73 |

TABLE 8

| | Composition of electrolyte salt Composition of nonaqueous electrolytic solution (volume ratio of solvent) | Lithium salt (I) or (II) | | 0° C. Discharge capacity retention rate after high-temperature charging storage (%) |
|---|---|---|---|---|
| | | Kind | Addition amount (content in nonaqueous electrolytic solution) (% by mass) | |
| Example B-6 | 1.2M LiPF6 EC/VC/DMC/MEC (29/1/40/30) | $CH_3CH_2-\underset{\underset{O}{\|}}{\overset{\overset{O}{\|}}{S}}-O-PF_5\ Li$ | 0.5 | 75 |
| Example B-7 | 1.2M LiPF6 EC/VC/DMC/MEC (29/1/40/30) | $CH_2=CH-\underset{\underset{O}{\|}}{\overset{\overset{O}{\|}}{S}}-O-PF_5\ Li$ | 0.5 | 73 |
| Example B-8 | 1.2M LiPF6 EC/VC/DMC/MEC (29/1/40/30) | $CH_3-\langle\text{C}_6\text{H}_4\rangle-\underset{\underset{O}{\|}}{\overset{\overset{O}{\|}}{S}}-O-PF_5\ Li$ | 0.5 | 72 |
| Example B-9 | 1.2M LiPF6 EC/VC/DMC/MEC (29/1/40/30) | $\left(CH_3-\underset{\underset{O}{\|}}{\overset{\overset{O}{\|}}{S}}-O\right)_2 PF_4\ Li$ | 0.5 | 73 |
| Example B-10 | 1.2M LiPF6 EC/VC/DMC/MEC (29/1/40/30) | $\left(CH_3-\underset{\underset{O}{\|}}{\overset{\overset{O}{\|}}{S}}-O\right)_3 PF_3\ Li$ | 0.5 | 72 |
| Example B-11 | 1.2M LiPF6 EC/VC/DMC/MEC (29/1/40/30) | $\left(CH_3-\underset{\underset{O}{\|}}{\overset{\overset{O}{\|}}{S}}-O\right)_4 PF_2\ Li$ | 0.5 | 71 |

TABLE 8-continued

| | Composition of electrolyte salt Composition of nonaqueous electrolytic solution (volume ratio of solvent) | Lithium salt (I) or (II) Kind | Addition amount (content in nonaqueous electrolytic solution) (% by mass) | 0° C. Discharge capacity retention rate after high-temperature charging storage (%) |
|---|---|---|---|---|
| Example B-12 | 1.2M LiPF6 EC/VC/DMC/MEC (29/1/40/30) | F₅P—O—S(=O)(=O)—CH₂—S(=O)(=O)—O—PF₅  2Li | 0.5 | 75 |
| Example B-13 | 1.2M LiPF6 EC/VC/DMC/MEC (29/1/40/30) | CH₃—S(=O)(=O)—O—AsF₅  Li | 0.5 | 75 |
| Example B-14 | 1.2M LiPF6 EC/VC/DMC/MEC (29/1/40/30) | CH₃—C₆H₄—S(=O)(=O)—O—AF₅  Li | 0.5 | 73 |
| Example B-15 | 1.2M LiPF6 EC/VC/DMC/MEC (29/1/40/30) | F₅As—O—S(=O)(=O)—CH₂—S(=O)(=O)—O—AsF₅  2Li | 0.5 | 74 |
| Example B-16 | 1.2M LiPF6 EC/VC/EEC/DMC/MEC (28/1/1/40/30) | CH₃—S(=O)(=O)—O—PF₅  Li | 0.5 | 83 |
| Example B-17 | 1.2M LiPF6 + 0.05M LiN(SO2CF3)2 EC/FEC/VC/DMC/MEC (19/10/1/40/30) | CH₃—S(=O)(=O)—O—PF₅  Li | 0.5 | 81 |
| Example B-18 | 1.2M LiPF6 + 0.05M LiBOB EC/FEC/VC/DMC/MEC (19/10/1/40/30) | CH₃—S(=O)(=O)—O—PF₅  Li | 0.5 | 83 |
| Example B-19 | 1.2M LiPF6 + 0.05M LiPO2F2 EC/FEC/VC/DMC/MEC (19/10/1/40/30) | CH₃—S(=O)(=O)—O—PF₅  Li | 0.5 | 82 |
| Example B-20 | 1.2M LiPF6 + 0.05M FSO3Li EC/FEC/VC/DMC/MEC (19/10/1/40/30) | CH₃—S(=O)(=O)—O—PF₅  Li | 0.5 | 84 |

TABLE 9

| | Composition of electrolyte salt Composition of nonaqueous electrolytic solution (volume ratio of solvent) | Lithium salt (I) or (II) Kind | Addition amount (content in nonaqueous electrolytic solution) (% by mass) | Group | Other additives Content in nonaqueous electrolytic solution (% by mass) | 0° C. Discharge capacity retention rate after high-temperature charging storage (%) | 0° C. Discharge capacity retention rate after high-temperature cycle (%) |
|---|---|---|---|---|---|---|---|
| Example B-21 | 1.2M LiPF6 | CH₃—S(=O)(=O)—O—PF₅  Li | 0.5 | A | Adiponitrile (1) | 81 | 83 |
| Example B-22 | EC/VC/DMC/MEC (29/1/40/30) | | 0.5 | B | Cyclohexylbenzene (2) + o-Terphenyl (1) | 81 | 80 |
| Example B-23 | | | 0.5 | C | Hexamethylene diisocyanate (1) | 81 | 81 |

TABLE 9-continued

| | Composition of electrolyte salt Composition of nonaqueous electrolytic solution (volume ratio of solvent) | Lithium salt (I) or (II) | | Other additives | | 0° C. Discharge capacity retention rate after high-temperature charging storage (%) | 0° C. Discharge capacity retention rate after high-temperature cycle (%) |
|---|---|---|---|---|---|---|---|
| | | Kind | Addition amount (content in nonaqueous electrolytic solution) (% by mass) | Group | Content in nonaqueous electrolytic solution (% by mass) | | |
| Example B-24 | | | 0.5 | D | 2-Butyne-1,4-diyl dimethanesulfonate (0.5) | 84 | 86 |
| Example B-25 | | | 0.5 | D | 2-Butyne-1,4-diyl dimethanesulfonate (1) | 84 | 85 |
| Example B-26 | | | 0.5 | E | 5,5-Dimethyl-1,2-oxathiolan-4-one 2,2-dioxide (1) | 83 | 85 |
| Example B-27 | | | 0.5 | G | 2-Propynyl 2-(diethoxyphosphoryl)acetate (0.5) | 83 | 84 |
| Example B-28 | | | 0.5 | G | 2-Propynyl 2-(diethoxyphosphoryl)acetate (1.5) | 84 | 85 |
| Example B-29 | | | 0.5 | H | 3-Allylsuccinic anhydride (1) | 83 | 84 |
| Example B-30 | | $CH_3-S(=O)(=O)-O-AsF_5\ Li$ | 0.5 | D | 2-Propynyl methanesulfonate (1) | 84 | 85 |
| Example B-31 | | | 0.5 | E | 2,4-Butanesultone (1) | 83 | 85 |
| Example B-32 | | | 0.5 | F | 1,3-Dioxane (1) | 82 | 83 |
| Comparative Example B-1 | | None | — | — | — | 64 | 65 |

Examples B-33 to B-35 and Comparative Example B-2

A negative electrode sheet was fabricated by using silicon (elemental substance) (negative electrode active material) in place of the negative electrode active material used in Example B-1. 80% by mass of silicon (elemental substance) and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. A coin-type battery was fabricated in the same manner as that in Example B-1, except that this negative electrode mixture paste was applied onto a copper foil (collector), dried, and treated under pressure, followed by punching out in a prescribed size, thereby fabricating a negative electrode sheet, and that the composition of the nonaqueous electrolytic solution was changed to a prescribed composition, and the battery was evaluated. The results are shown in Table 10.

TABLE 10

| | Composition of electrolyte salt Composition of nonaqueous electrolytic solution (volume ratio of solvent) | Lithium salt (I) or (II) | | Other additives | | 0° C. Discharge capacity retention rate after high-temperature charging storage (%) |
|---|---|---|---|---|---|---|
| | | Kind | Addition amount (content in nonaqueous electrolytic solution) (% by mass) | Group | Content in nonaqueous electrolytic solution (% by mass) | |
| Example B-33 | 1.2M LiPF6 PC/FEC/DMC/MEC (15/15/40/30) | $CH_3-S(=O)(=O)-O-PF_5\ Li$ | 0.5 | — | — | 68 |
| Example B-34 | 1.2M LiPF6 PC/FEC/DMC/MEC (15/15/40/30) | $CH_3-S(=O)(=O)-O-AsF_5\ Li$ | 0.5 | — | — | 67 |

TABLE 10-continued

| Composition of electrolyte salt Composition of nonaqueous electrolytic solution (volume ratio of solvent) | Lithium salt (I) or (II) Kind | Addition amount (content in nonaqueous electrolytic solution) (% by mass) | Other additives Group | Content in nonaqueous electrolytic solution (% by mass) | 0° C. Discharge capacity retention rate after high-temperature charging storage (%) |
|---|---|---|---|---|---|
| Example B-35 | 1.2M LiPF6 PC/FEC/DMC/MEC (15/15/40/30) | $CH_3\text{—}S(=O)_2\text{—}O\text{—}PF_5\ Li$ | 0.5 | G | 2-Propynyl 2-(diethoxyphosphoryl) acetate (1) | 72 |
| Comparative Example B-2 | 1.2M LiPF6 PC/FEC/DMC/MEC (15/15/40/30) | None | — | — | — | 48 |

Examples B-36 to B-39 and Comparative Example B-3

A negative electrode sheet was fabricated by using lithium titanate $Li_4Ti_5O_{12}$ (negative electrode active material) in place of the negative electrode active material used in negative electrode sheet; that in evaluating the battery, the final charging voltage and the final discharging voltage were set to 2.8 V and 1.2 V, respectively; and that the composition of the nonaqueous electrolytic solution was changed to a prescribed composition, and the battery was evaluated. The results are shown in Table 11.

TABLE 11

| Composition of electrolyte salt Composition of nonaqueous electrolytic solution (volume ratio of solvent) | Lithium salt (I) or (II) Kind | Addition amount (content in nonaqueous electrolytic solution) (% by mass) | Other additives Group | Content in nonaqueous electrolytic solution (% by mass) | 0° C. Discharge capacity retention rate after high-temperature charging storage (%) |
|---|---|---|---|---|---|
| Example B-36 | 1.2M LiPF6 PC/DEC (30/70) | $CH_3\text{—}S(=O)_2\text{—}O\text{—}PF_5\ Li$ | 0.5 | — | — | 82 |
| Example B-37 | 1.2M LiPF6 PC/DMC/MEC (30/40/30) | $CH_3\text{—}S(=O)_2\text{—}O\text{—}PF_5\ Li$ | 0.5 | — | — | 83 |
| Example B-38 | 1.2M LiPF6 PC/DEC (30/70) | $CH_3\text{—}S(=O)_2\text{—}O\text{—}AsF_5\ Li$ | 0.5 | — | — | 81 |
| Example B-39 | 1.2M LiPF6 PC/DEC (30/70) | $CH_3\text{—}S(=O)_2\text{—}O\text{—}PF_5\ Li$ | 0.5 | G | Di(2-propynyl) oxalate (0.5) | 87 |
| Comparative Example B-3 | 1.2M LiPF6 PC/DEC (30/70) | None | — | — | — | 65 |

Example B-1. 80% by mass of lithium titanate $Li_4Ti_5O_{12}$ and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. A coin-type battery was fabricated in the same manner as that in Example B-1, except that this negative electrode mixture paste was applied onto a copper foil (collector), dried, and treated under pressure, followed by punching out in a prescribed size, thereby fabricating a

Examples B-40 to B-42 and Comparative Example B-4

A positive electrode sheet was fabricated by using $LiFePO_4$ (positive electrode active material) coated with amorphous carbon in place of the positive electrode active material used in Example B-1. 90% by mass of $LiFePO_4$ coated with amorphous carbon and 5% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a positive electrode mixture paste. A coin-type battery was fabricated in the same manner as that in Example B-1, except that this positive electrode mixture paste was applied onto an aluminum foil (collector), dried, and treated under pressure, followed by punching out in a prescribed size, thereby fabricating a positive electrode sheet; that in evaluating the battery, the final charging voltage and the final discharging voltage were set to 3.6 V and 2.0 V, respectively; and that the composition of the nonaqueous electrolytic solution was changed to a prescribed composition, and the battery was evaluated. The results are shown in Table 12.

of using silicon (elemental substance) Si or lithium titanate for the negative electrode and the case of using a lithium-containing olivine-type iron phosphate salt for the positive electrode, and therefore, it is clear that this effect is not an effect relying upon a specified positive electrode or negative electrode.

Furthermore, the nonaqueous electrolytic solutions obtained in Examples B-1 to B-42 also have an effect for improving discharging properties of a lithium primary battery in a broad temperature range.

TABLE 12

| | Composition of electrolyte salt | Lithium salt (I) or (II) | | | Other additives | | 0° C. Discharge |
|---|---|---|---|---|---|---|---|
| | Composition of nonaqueous electrolytic solution (volume ratio of solvent) | Kind | Addition amount (content in nonaqueous electrolytic solution) (% by mass) | Group | Content in nonaqueous electrolytic solution (% by mass) | | capacity retention rate after high-temperature charging storage (%) |
| Example B-40 | 1.2M LiPF6 EC/VC/DEC/MEC (29/1/40/30) | $CH_3-\overset{O}{\underset{O}{\overset{\|}{S}}}-O-PF_5 \text{ Li}$ | 0.5 | — | — | | 82 |
| Example B-41 | 1.2M LiPF6 EC/VC/DEC/MEC (29/1/40/30) | $CH_3-\overset{O}{\underset{O}{\overset{\|}{S}}}-O-AsF_5 \text{ Li}$ | 0.5 | — | — | | 81 |
| Example B-42 | 1.2M LiPF6 EC/VC/DEC/MEC (29/1/40/30) | $CH_3-\overset{O}{\underset{O}{\overset{\|}{S}}}-O-PF_5 \text{ Li}$ | 0.5 | D | Methyl 2-propynyl carbonate (0.5) | | 85 |
| Comparative Example B-4 | 1.2M LiPF6 EC/VC/DEC/MEC (29/1/40/30) | None | — | — | — | | 63 |

In all of the lithium secondary batteries of the foregoing Examples B-1 to B-42, the low-temperature properties after high-temperature charging storage are remarkably improved as compared with the lithium secondary battery of Comparative Example B-1 in the case of not adding the lithium salt represented by the general formula (XI-2) or (XIII-2) in the nonaqueous electrolytic solution of the present invention. From the foregoing, it has been clarified that the advantageous effect of the present invention is a peculiar effect to the case of containing the specified lithium salt of the invention of the present application in an amount of from 0.001 to 5% by mass in the nonaqueous electrolytic solution of an electrolyte salt dissolved in a nonaqueous solvent. In addition, the 0° C. discharge capacity retention rate of the lithium secondary battery fabricated in Example B-4 (other additives were not added) after high-temperature cycle is 78%, and similar to Examples B-21 to B-32 (other additives were added), the low-temperature properties after high-temperature cycle was remarkably improved as compared with Comparative Example B-1.

In addition, from comparison between Examples B-33 to B-35 and Comparative Example B-2 and comparison between Examples B-36 to B-38 and Comparative Example B-3 as well as between Examples B-40 to B-42 and Comparative Example B-4, the same effect is observed in the case C. Next, an effect by addition of the lithium salt represented by the general formula (XII-1) or (XIII-3) is described in detail by reference to the Examples.

Synthesis Example C-1 [Synthesis of Synthetic Compound C-1]

40.82 g (0.40 moles) of lithium methanesulfonate and 85.16 g (0.60 moles) of a boron trifluoride-diethyl ether complex were added to 60 mL of dimethyl carbonate, and the contents were stirred at 50° C. for one hour. After distilling off the ether and dimethyl carbonate under reduced pressure, the temperature was increased to 100° C., and the excessive boron trifluoride-diethyl ether complex was distilled off, thereby obtaining 77.48 g (yield: 98%) of the desired Compound C-1: $[CH_3-SO_3 \, (BF_3)_{1.41}]Li$.

The obtained Synthetic Compound C-1 was subjected to $^1$H-NMR measurement, and a structure thereof was confirmed. The results are shown below.

$^1$H-NMR (400 MHz, CDCl3): δ=2.41 (s, 3H)

In addition, according to quantitative measurement by $^1$H-NMR and $^{19}$F-NMR, a content of the boron trifluoride molecule was found to be 1.41 moles per mole of the methanesulfonate anion.

Examples C-1 to C-27 and Comparative Example C-1

Production of Lithium Ion Secondary Battery

94% by mass of $LiNi_{0.5}Mn_{0.3}Co_{0.2}O_2$ (positive electrode active material; a supernatant at the time of dispersing 10 g of the positive electrode active material in 100 mL of distilled water had a pH of 11.0) and 3% by mass of acetylene black (electroconductive agent) were mixed and then added to and mixed with a solution which had been prepared by dissolving 3% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by punching out in a prescribed size, thereby fabricating a positive electrode sheet. A density of a portion of the positive electrode except for the collector was 3.6 g/cm$^3$.

In addition, a negative electrode sheet (peak intensity ratio [I(110)/I(004)]=0.1) was fabricated in the same manner as that in Example A-1. Then, the positive electrode sheet, a microporous polyethylene film-made separator, and the negative electrode sheet were laminated in this order, and a nonaqueous electrolytic solution having a composition shown in each of Tables 13 to 15 was added thereto, thereby fabricating a 2032 coin-type battery.

[Evaluation of Low-Temperature Properties after High-Temperature Charging Storage]

The initial discharge capacity, the high-temperature charging storage test, the discharge capacity after high-temperature charging storage, and the low-temperature properties after high-temperature charging storage were evaluated in the same manners as those in Example A-1.

[Evaluation of Low-Temperature Properties after High-Temperature Cycle]

In a thermostatic chamber at 45° C., the battery fabricated by the above-described method was treated by repeating a cycle of charging up to a final voltage of 4.3 V with a constant current of 1 C and under a constant voltage for 3 hours and subsequently discharging to a discharge voltage of 3.0 V with a constant current of 1 C, until it reached 200 cycles. Then, the low-temperature properties after high-temperature cycle were determined in the same manner as described above from the following 0° C. discharge capacity retention rate.

0° C. Discharge capacity retention rate after high-temperature cycle (%)=(Discharge capacity at 0° C. after high-temperature cycle)/(Initial discharge capacity at 0° C.)×100

Battery characteristics are shown in Tables 13 to 15.

TABLE 13

| | Composition of electrolyte salt Composition of nonaqueous electrolytic solution (volume ratio of solvent) | Lithium salt (I) | | | 0° C. Discharge capacity retention rate after high-temperature charging storage (%) |
|---|---|---|---|---|---|
| | | Structural formula | Molar number of BF3 per mole of sulfonate anion | Addition amount (content in nonaqueous electrolytic solution) (% by mass) | |
| Example C-1 | 1.1M LiPF6 EC/DMC/MEC (30/50/20) | [H$_3$C—SO$_3$ (BF$_3$)t$_1$]Li | 1.41 | 0.5 | 78 |
| Example C-2 | 1.1M LiPF6 EC/MEC (30/70) | [H$_3$C—SO$_3$ (BF$_3$)t$_1$]Li | 1.41 | 0.5 | 74 |
| Example C-3 | 1.1M LiPF6 EC/VC/DMC/MEC (29/1/50/20) | [H$_3$C—SO$_3$ (BF$_3$)t$_1$]Li | 1.02 | 0.5 | 80 |
| Example C-4 | 1.1M LiPF6 EC/VC/DMC/MEC (29/1/50/20) | [H$_3$C—SO$_3$ (BF$_3$)t$_1$]Li | 1.08 | 0.5 | 81 |
| Example C-5 | 1.1M LiPF6 EC/VC/DMC/MEC (29/1/50/20) | [H$_3$C—SO$_3$ (BF$_3$)t$_1$]Li | 1.41 | 0.5 | 82 |
| Example C-6 | 1.1M LiPF6 EC/VC/DMC/MEC (29/1/50/20) | [H$_3$C—SO$_3$ (BF$_3$)t$_1$]Li | 1.86 | 0.5 | 78 |
| Example C-7 | 1.1M LiPF6 EC/VC/DMC/MEC (29/1/50/20) | [H$_3$C—SO$_3$ (BF$_3$)t$_1$]Li | 1.41 | 0.01 | 76 |
| Example C-8 | 1.1M LiPF6 EC/VC/DMC/MEC (29/1/50/20) | [H$_3$C—SO$_3$ (BF$_3$)t$_1$]Li | 1.41 | 0.1 | 78 |
| Example C-9 | 1.1M LiPF6 EC/VC/DMC/MEC (29/1/50/20) | [H$_3$C—SO$_3$ (BF$_3$)t$_1$]Li | 1.41 | 2 | 78 |

TABLE 14

| | Composition of electrolyte salt Composition of nonaqueous electrolytic solution (volume ratio of solvent) | Lithium salt (I) Structural formula | Molar number of $BF_3$ per mole of sulfonate anion | Addition amount (content in nonaqueous electrolytic solution) (% by mass) | 0° C. Discharge capacity retention rate after high-temperature charging storage (%) |
|---|---|---|---|---|---|
| Example C-10 | 1.1M LiPF6 EC/VC/DMC/MEC (29/1/50/20) | 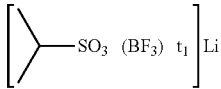 | 1.44 | 0.5 | 81 |
| Example C-11 | 1.1M LiPF6 EC/VC/DMC/MEC (29/1/50/20) | 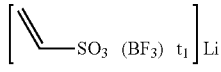 | 1.47 | 0.5 | 77 |
| Example C-12 | 1.1M LiPF6 EC/VC/DMC/MEC (29/1/50/20) | 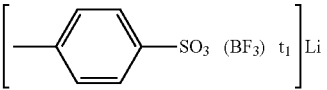 | 1.38 | 0.5 | 76 |
| Example C-13 | 1.1M LiPF6 EC/VC/DMC/MEC (29/1/50/20) | 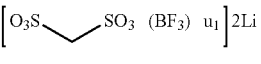 | 2.81 | 0.5 | 79 |
| Example C-14 | 1.2M LiPF6 EC/EEC/DMC/MEC (29/1/50/20) | [$H_3C$—$SO_3$ ($BF_3$) $t_1$]Li | 1.41 | 0.5 | 85 |
| Example C-15 | 1.2M LiPF6 + 0.05M LiN(SO2CF3)2 EC/FEC/VC/DMC/MEC (19/10/1/50/20) | [$H_3C$—$SO_3$ ($BF_3$) $t_1$]Li | 1.41 | 0.5 | 86 |
| Example C-16 | 1.2M LiPF6 + 0.05M LiBOB EC/FEC/VC/DMC/MEC (19/10/1/50/20) | [$H_3C$—$SO_3$ ($BF_3$) $t_1$]Li | 1.41 | 0.5 | 87 |

TABLE 15

| | Composition of electrolyte salt Composition of nonaqueous electrolytic solution (volume ratio of solvent) | Lithium salt (I) | | | Other additives | | 0° C. Discharge capacity retention rate after high-temperature charging storage (%) | 0° C. Discharge capacity retention rate after high-temperature cycle (%) |
|---|---|---|---|---|---|---|---|---|
| | | Structural formula | Molar number of $BF_3$ per mole of sulfonate anion | Addition amount (content in nonaqueous electrolytic solution) (% by mass) | Group | Content in nonaqueous electrolytic solution (% by mass) | | |
| Example C-17 | 1.1M LiPF6 EC/VC/DMC/MEC (29/1/50/20) | [$H_3C$—$SO_3$ ($BF_3$) $t_1$] Li | 1.41 | 0.5 | A | Adiponitrile (1 wt %) | 85 | 84 |
| Example C-18 | | | | | B | Cyclohexylbenzene (2 wt %) + o-Terphenyl (1 wt %) | 83 | 84 |
| Example C-19 | | | | | C | Hexamethylene diisocyanate (1 wt %) | 84 | 85 |
| Example C-20 | | | | | C | Hexamethylene diisocyanate (2 wt %) | 82 | 83 |
| Example C-21 | | | | | D | 2-Butyne-1,4-diyl dimethanesulfonate (1 wt %) | 88 | 87 |
| Example C-22 | | | | | E | 2,4-Butanesultone (1 wt %) | 84 | 85 |
| Example C-23 | | | | | E | 5,5-Dimethyl-1,2-oxa-thiolan-4-one 2,2-dioxide (0.5) | 85 | 86 |
| Example C-24 | | | | | F | 1,3-Dioxane (1 wt %) | 86 | 85 |
| Example C-25 | | | | | G | 2-Propynyl 2-(diethoxyphosphoryl) acetate (0.5) | 85 | 85 |
| Example C-26 | | | | | G | 2-Propynyl 2-(diethoxyphosphoryl) acetate (1.5) | 86 | 87 |

TABLE 15-continued

| | Composition of electrolyte | Lithium salt (I) | | | | | 0° C. Discharge capacity retention rate after high-temperature charging storage (%) | 0° C. Discharge capacity retention rate after high-temperature cycle (%) |
|---|---|---|---|---|---|---|---|---|
| | salt Composition of nonaqueous electrolytic solution (volume ratio of solvent) | Structural formula | Molar number of $BF_3$ per mole of sulfonate anion | Addition amount (content in nonaqueous electrolytic solution) (% by mass) | Group | Other additives Content in nonaqueous electrolytic solution (% by mass) | | |
| Example C-27 | | | | | H | 3-Allylsuccinic anhydride (1) | 85 | 84 |
| Comparative Example C-1 | | None | — | — | — | — | 65 | 66 |

Examples C-28 and C-29 and Comparative Example C-2

A negative electrode sheet was fabricated by using silicon (elemental substance) (negative electrode active material) in place of the negative electrode active material used in Example C-1. 80% by mass of silicon (elemental substance) and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. A coin-type battery was fabricated in the same manner as that in Example C-1, except that this negative electrode mixture paste was applied onto a copper foil (collector), dried, and treated under pressure, followed by punching out in a prescribed size, thereby fabricating a negative electrode sheet, and that the composition of the nonaqueous electrolytic solution was changed to a prescribed composition, and the battery was evaluated. The results are shown in Table 16.

Examples C-30 and C-31 and Comparative Example C-3

A negative electrode sheet was fabricated by using lithium titanate $Li_4Ti_5O_{12}$ (negative electrode active material) in place of the negative electrode active material used in Example C-1. 80% by mass of lithium titanate $Li_4Ti_5O_{12}$ and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. A coin-type battery was fabricated in the same manner as that in Example C-1, except that this negative electrode mixture paste was applied onto a copper foil (collector), dried, and treated under pressure, followed by punching out in a prescribed size, thereby fabricating a negative electrode sheet; that in evaluating the battery, the final charging voltage and the final discharging voltage were set to 2.8 V and 1.2 V, respectively; and that the composition of the nonaqueous electrolytic solution was changed to a

TABLE 16

| | Composition of electrolyte salt Composition of nonaqueous electrolytic solution (volume ratio of solvent) | Lithium salt (I) | | | | | 0° C. Discharge capacity retention rate after high-temperature charging storage (%) |
|---|---|---|---|---|---|---|---|
| | | Structural formula | Molar number of $BF_3$ per mole of sulfonate anion | Addition amount (content in nonaqueous electrolytic solution) (% by mass) | Group | Other additives Content in nonaqueous electrolytic solution (% by mass) | |
| Example C-28 | 1.1 M LiPF6 PC/FEC/DMC/MEC (15/15/50/20) | [H₃C—SO₃(BF₃) t₁] Li | 1.41 | 0.5 | — | — | 76 |
| Example C-29 | 1.1 M LiPF6 PC/FEC/DMC/MEC (15/15/50/20) | [H₃C—SO₃(BF₃) t₁] Li | 1.41 | 0.5 | G | 2-Propynyl 2-(diethoxyphosphoryl) acetate (1) | 80 |
| Comparative Example C-2 | 1.1 M LiPF6 PC/FEC/DMC/MEC (15/15/50/20) | None | — | — | — | — | 49 | prescribed composition, and the battery was evaluated. The results are shown in Table 17.

In all of the lithium secondary batteries of the foregoing Examples C-1 to C-33, the low-temperature properties after

TABLE 17

| | Composition of electrolyte salt Composition of nonaqueous electrolytic solution (volume ratio of solvent) | Lithium salt (I) | | | Other additives | | 0° C. Discharge capacity retention rate after high-temperature charging storage (%) |
|---|---|---|---|---|---|---|---|
| | | Structural formula | Molar number of $BF_3$ per mole of sulfonate anion | Addition amount (content in nonaqueous electrolytic solution) (% by mass) | Group | Content in nonaqueous electrolytic solution (% by mass) | |
| Example C-30 | 1.1 M LiPF6 PC/DEC (30/70) | [$H_3C-SO_3$ $(BF_3)$ $t_1$] Li | 1.41 | 0.5 | — | — | 86 |
| Example C-31 | 1.1 M LiPF6 PC/DEC (30/70) | [$H_3C-SO_3$ $(BF_3)$ $t_1$] Li | 1.41 | 0.5 | D | Di (2-propynyl) oxalate (0.5) | 89 |
| Comparative Example C-3 | 1.1 M LiPF6 PC/DEC (30/70) | None | — | — | — | — | 66 |

Examples C-32 and C-33 and Comparative Example C-4

A positive electrode sheet was fabricated by using LiFePO$_4$ (positive electrode active material) coated with amorphous carbon in place of the positive electrode active material used in Example C-1. 90% by mass of LiFePO$_4$ coated with amorphous carbon and 5% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a positive electrode mixture paste. A coin-type battery was fabricated in the same manner as that in Example C-1, except that this positive electrode mixture paste was applied onto an aluminum foil (collector), dried, and treated under pressure, followed by punching out in a prescribed size, thereby fabricating a positive electrode sheet; that in evaluating the battery, the final charging voltage and the final discharging voltage were set to 3.6 V and 2.0 V, respectively; and that the composition of the nonaqueous electrolytic solution was changed to a prescribed composition, and the battery was evaluated. The results are shown in Table 18.

high-temperature charging storage are remarkably improved as compared with the lithium secondary battery of Comparative Example C-1 in the case of not adding the lithium salt represented by the general formula (XII-1) or (XIII-3) in the nonaqueous electrolytic solution of the present invention. From the foregoing, it has been clarified that the advantageous effect of the present invention is a peculiar effect to the case of containing the compound of the invention of the present application in the nonaqueous electrolytic solution of an electrolyte salt dissolved in a nonaqueous solvent. In addition, the 0° C. discharge capacity retention rate of the lithium secondary battery fabricated in Example C-4 (other additives were not added) after high-temperature cycle is 83%, and similar to Examples C-17 to C-27 (other additives were added), the 0° C. discharge capacity retention rate after high-temperature cycle was remarkably improved as compared with Comparative Example C-1.

In addition, from comparison between Examples C-28 to C-29 and Comparative Example C-2 and comparison between Examples C-30 to C-31 and Comparative Example C-3 as well as between Examples C-32 to C-33 and Comparative Example C-4, the same effect is observed in the case of using silicon (elemental substance) Si or lithium titanate

TABLE 18

| | Composition of electrolyte salt Composition of nonaqueous electrolytic solution (volume ratio of solvent) | Lithium salt (I) | | | Other additives | | 0° C. Discharge capacity retention rate after high-temperature charging storage (%) |
|---|---|---|---|---|---|---|---|
| | | Structural formula | Molar number of $BF_3$ per mole of sulfonate anion | Addition amount (content in nonaqueous electrolytic solution) (% by mass) | Group | Content in nonaqueous electrolytic solution (% by mass) | |
| Example C-32 | 1.1 M LiPF6 PC/FEC/DMC/MEC (29/1/50/20) | [$H_3C-SO_3$ $(BF_3)$ $t_1$] Li | 1.41 | 0.5 | — | — | 89 |
| Example C-33 | 1.1 M LiPF6 EC/VC/DMC/MEC (29/1/50/20) | [$H_3C-SO_3$ $(BF_3)$ $t_1$] Li | 1.41 | 0.5 | D | Methyl 2-propynyl carbonate (0.5) | 91 |
| Comparative Example C-4 | 1.1 M LiPF6 EC/VC/DMC/MEC (29/1/50/20) | None | — | — | — | — | 62 | for the negative electrode and the case of using a lithium-containing olivine-type iron phosphate salt for the positive electrode, and therefore, it is clear that this effect is not an effect relying upon a specified positive electrode or negative electrode.

Furthermore, the nonaqueous electrolytic solutions obtained in Examples C-1 to C-33 also have an effect for improving discharging properties of a lithium primary battery in a broad temperature range.

INDUSTRIAL APPLICABILITY

By using the nonaqueous electrolytic solution of the present invention, an energy storage device that is excellent in electrochemical characteristics in a broad temperature range can be obtained. In particular, in the case where the nonaqueous electrolytic solution of the present invention is used as a nonaqueous electrolytic solution for an energy storage device of lithium secondary battery or the like to be mounted on a hybrid electric vehicle, a plug-in hybrid electric vehicle, a battery electric vehicle, and the like, an energy storage device whose electrochemical characteristics are hardly worsened in a broad temperature range can be obtained.

The invention claimed is:

1. A nonaqueous electrolytic solution of an electrolyte salt dissolved in a nonaqueous solvent, which comprises one or more selected from acyclic lithium salts represented by formula (I) or (II) in an amount of from 0.001 to 5% by mass in the nonaqueous electrolytic solution:

$$(A^1)(YFm)p(Li)q \quad (I)$$

wherein $A^1$ is a group represented by formula (III) or (IV); Y is a boron atom, a phosphorus atom, or an arsenic atom; F is a fluorine atom; m is an integer of 3 or 5; p is from 1 to 6; q represents a valence of the group $A^1$ and is an integer of from 1 to 3, provided that when the group $A^1$ is monovalent (q=1), then p is from 1 to 3, and when the group $A^1$ is divalent (q=2), then p is from 2 to 6; and
when Y is a boron atom, then m is 3, and when Y is a phosphorus atom or an arsenic atom, then m is 5;

$$(A^2)x(YFn)(Li) \quad (II)$$

wherein $A^2$ is a group represented by the following general formula (III); and plural $A^2$s may be the same as or different from each other; Y is a boron atom, a phosphorus atom, or an arsenic atom; and F is a fluorine atom; and when Y is a boron atom, then x is an integer of from 2 to 4, and (x+n) is 4; and when Y is a phosphorus atom or an arsenic atom, then x is an integer of from 2 to 6, and (x+n) is 6;

(III)

(IV)

wherein R represents an alkyl group having from 1 to 6 carbon atoms, an alkenyl group having from 2 to 6 carbon atoms, an aryl group having from 6 to 12 carbon atoms, an alkylene group having from 1 to 6 carbon atoms, or a halogen atom, and at least one hydrogen atom on R is optionally substituted with a halogen atom.

2. The nonaqueous electrolytic solution according to claim 1, wherein the acyclic lithium salt represented by (I) or (II) is one or more selected from acyclic lithium salts represented by any of formulae (XI) to (XIII):

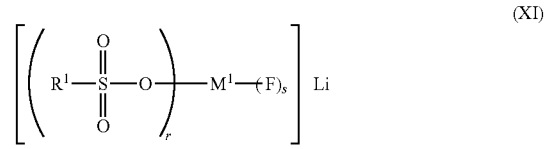
(XI)

wherein $R^1$ represents an alkyl group having from 1 to 6 carbon atoms, an alkenyl group having from 2 to 6 carbon atoms, an aryl group having from 6 to 12 carbon atoms, or a halogen atom; $M^1$ represents a boron atom, a phosphorus atom, or an arsenic atom; r is an integer of from 1 to 6; and s is an integer of from 0 to 5; and when $M^1$ is a boron atom, then (r+s) is 4; and when $M^1$ is a phosphorus atom or an arsenic atom, then (r+s) is 6; and at least one hydrogen atom on $R^1$ is optionally substituted with a halogen atom;

(XII)

wherein $Y^1$ represents $BF_3$, $PF_5$, or $AsF_5$; and t is from 1 to 3; and when $Y^1$ is $BF_3$, then t is from 1 to 3; and when $Y^1$ is $PF_5$ or $AsF_5$, then t is 1;

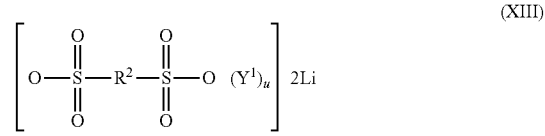
(XIII)

wherein $R^2$ represents an alkylene group having from 1 to 6 carbon atoms; and u is from 2 to 6; and when $Y^1$ is $BF_3$, then u is from 2 to 6; and when $Y^1$ is $PF_5$ or $AsF_5$, then u is 2; and at least one hydrogen atom on $R^2$ is optionally substituted with a halogen atom.

3. The nonaqueous electrolytic solution according to claim 2, wherein the lithium salt represented by (XI) is one or more selected from the group consisting of lithium bis(methanesulfonate) difluoroborate, lithium tris(methanesulfonate) fluoroborate, lithium tetrakis(methanesulfonate) borate, lithium methanesulfonate trifluoroborate, lithium ethanesulfonate trifluoroborate, lithium propane-2-sulfonate trifluoroborate, lithium trifluoromethanesulfonate trifluoroborate, lithium vinylsulfonate trifluoroborate, lithium 2-propen-1-ylsulfonate trifluoroborate, lithium benzenesulfonate trifluoroborate, lithium 4-methylbenzenesulfonate trifluoroborate, lithium fluorosulfonate trifluoroborate, lithium methanesulfonate pentafluorophosphate, lithium ethanesulfonate pentafluorophosphate, lithium vinylsulfonate pentafluorophosphate, lithium 4-methylbenzenesulfonate pentafluorophosphate, lithium methanesulfonate pentafluoroarsenate, lithium ethanesulfonate pentafluoroarsenate, lithium vinylsulfonate pentafluoroarsenate, and lithium 4-methylbenzenesulfonate pentafluoroarsenate.

4. The nonaqueous electrolytic solution according to claim 2, wherein the lithium salt represented by (XII) is one or more selected from the group consisting of Compound 1, Compound 2, Compound 4, Compound 11, Compound 13, Compound 15, Compound 21, Compound 23, and Compound 26:

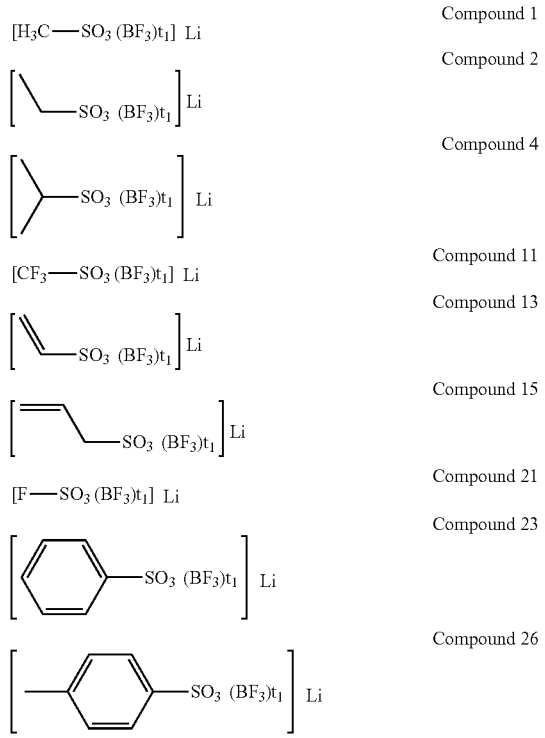

wherein $t_1$ is from 1 to 3.

5. The nonaqueous electrolytic solution according to claim 2, wherein the lithium salt represented by (XIII) is one or more selected from the group consisting of dilithium methanedisulfonate bis(trifluoroborate), dilithium ethane-1,2-diyldisulfonate bis(trifluoroborate), dilithium methanedisulfonate bis(pentafluorophosphate), dilithium ethane-1,2-diyldisulfonate bis(pentafluorophosphate), dilithium methanedisulfonate bis(pentafluoroarsenate), and dilithium ethane-1,2-diyldisulfonate bis(pentafluoroarsenate).

6. The nonaqueous electrolytic solution according to claim 2, wherein the lithium salt represented by (XIII) is one or more compounds represented by formula (XIII-3):

wherein $u_1$ is from 2 to 6.

7. The nonaqueous electrolytic solution according to claim 1, wherein the nonaqueous solvent comprises at least one cyclic carbonate.

8. The nonaqueous electrolytic solution according to claim 7, wherein the cyclic carbonate is one or more selected from the group consisting of ethylene carbonate, propylene carbonate, 1,2-butylene carbonate, 2,3-butylene carbonate, 4-fluoro-1,3-dioxolan-2-one, trans- or cis-4,5-difluoro-1,3-dioxolan-2-one, vinylene carbonate, vinyl ethylene carbonate, and 4-ethynyl-1,3-dioxolan-2-one.

9. The nonaqueous electrolytic solution according to claim 1, wherein the nonaqueous solvent comprises a linear ester.

10. The nonaqueous electrolytic solution according to claim 9, wherein the linear ester is one or more selected from the group consisting of asymmetric linear carbonates selected from methyl ethyl carbonate, methyl propyl carbonate, methyl isopropyl carbonate, methyl butyl carbonate, and ethyl propyl carbonate; symmetric linear carbonates selected from dimethyl carbonate, diethyl carbonate, dipropyl carbonate, and dibutyl carbonate; and linear carboxylic acid esters.

11. The nonaqueous electrolytic solution according to claim 1, wherein the nonaqueous electrolytic solution comprises one or more selected from the group consisting of nitriles, aromatic compounds, isocyanate compounds, triple bond-comprising compounds, S=O group-comprising compounds, cyclic acetal compounds, phosphorus-comprising compounds, cyclic acid anhydrides, and cyclic phosphazene compounds.

12. The nonaqueous electrolytic solution according to claim 1, wherein the electrolyte salt comprises one or more lithium salts selected from the group consisting of $LiPF_6$, $LiPO_2F_2$, $Li_2PO_3F$, $LiBF_4$, $FSO_3Li$, $LiN(SO_2F)_2$, $LiN(SO_2CF_3)_2$, $LiN(SO_2C_2F_5)_2$, lithium bis[oxalate-O,O']borate, lithium difluorobis[oxalate-O,O']phosphate, and lithium tetrafluoro[oxalate-O,O']phosphate.

13. The nonaqueous electrolytic solution according to claim 12, wherein the lithium salt comprises $LiPF_6$ and further comprises one or more selected from the group consisting of $LiPO_2F_2$, $LiN(SO_2F)_2$, $LiBF_4$, lithium bis[oxalate-O,O']borate (LiBOB), lithium difluorobis[oxalate-O,O']phosphate (LiPFO), and $FSO_3Li$.

14. The nonaqueous electrolytic solution according to claim 1, wherein a concentration of the lithium salt is from 0.3 to 2.5 M relative to the nonaqueous solvent.

15. An energy storage device comprising a positive electrode, a negative electrode, and a nonaqueous electrolytic solution of an electrolyte salt dissolved in a nonaqueous solvent,
wherein the nonaqueous electrolytic solution comprises one or more selected from acyclic lithium salts represented by formula (I) or (II), or acyclic lithium salts represented by any of formulae (XI) to (XIII) in an amount of from 0.001 to 5% by mass in the nonaqueous electrolytic solution,
wherein

where $A^1$ is a group represented by formula (III) or (IV); Y is a boron atom, a phosphorus atom, or an arsenic atom; F is a fluorine atom; m is an integer of 3 or 5; p is from 1 to 6; q represents a valence of the group $A^1$ and is an integer of from 1 to 3, provided that when the group $A^1$ is monovalent (q=1), then p is from 1 to 3, and when the group $A^1$ is divalent (q=2), then p is from 2 to 6; and when Y is a boron atom, then m is 3, and when Y is a phosphorus atom or an arsenic atom, then m is 5;

where $A^2$ is a group represented by formula (III); and plural $A^2$s may be the same as or different from each other; Y is a boron atom, a phosphorus atom, or an arsenic atom; and F is a fluorine atom; when Y is a boron atom, then x is an integer of from 2 to 4, and (x+n) is 4; and when Y is a phosphorus atom or an arsenic atom, then x is an integer of from 2 to 6, and (x+n) is 6;

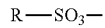  (III)

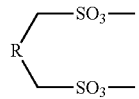  (IV)

wherein R represents an alkyl group having from 1 to 6 carbon atoms, an alkenyl group having from 2 to 6 carbon atoms, an aryl group having from 6 to 12 carbon atoms, an alkylene group having from 1 to 6 carbon atoms, or a halogen atom, and at least one hydrogen atom on R is optionally substituted with a halogen atom,

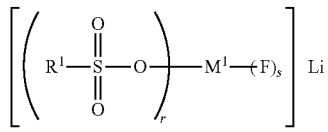  (XI)

wherein $R^1$ represents an alkyl group having from 1 to 6 carbon atoms, an alkenyl group having from 2 to 6 carbon atoms, an aryl group having from 6 to 12 carbon atoms, or a halogen atom; $M^1$ represents a boron atom, a phosphorus atom, or an arsenic atom; r is an integer of from 1 to 6; and s is an integer of from 0 to 5; when $M^1$ is a boron atom, then (r+s) is 4; and when $M^1$ is a phosphorus atom or an arsenic atom, then (r+s) is 6; and at least one hydrogen atom on R is optionally substituted with a halogen atom;

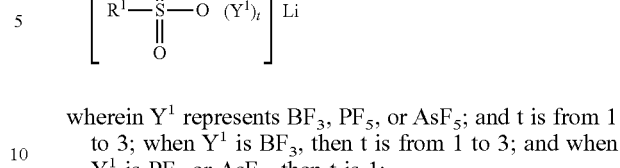  (XII)

wherein $Y^1$ represents $BF_3$, $PF_5$, or $AsF_5$; and t is from 1 to 3; when $Y^1$ is $BF_3$, then t is from 1 to 3; and when $Y^1$ is $PF_5$ or $AsF_5$, then t is 1;

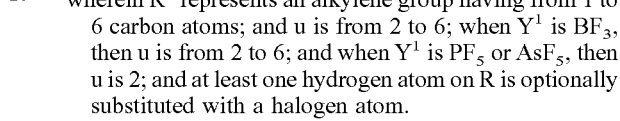  (XIII)

wherein $R^2$ represents an alkylene group having from 1 to 6 carbon atoms; and u is from 2 to 6; when $Y^1$ is $BF_3$, then u is from 2 to 6; and when $Y^1$ is $PF_5$ or $AsF_5$, then u is 2; and at least one hydrogen atom on R is optionally substituted with a halogen atom.

16. The energy storage device according to claim 15, wherein the positive electrode active material is
   a complex metal oxide of lithium comprising one or more selected from the group consisting of cobalt, manganese, and nickel, or
   a lithium-comprising olivine-type phosphate comprising one or more selected from the group consisting of iron, cobalt, nickel, and manganese.

17. The energy storage device according to claim 15, wherein the negative electrode active material comprises one or more selected from the group consisting of lithium metal, a lithium alloy, a carbon material capable of absorbing and releasing lithium, tin, a tin compound, silicon, a silicon compound, and a lithium titanate compound.

* * * * *